US012393471B2

(12) United States Patent
Srivastava et al.

(10) Patent No.: US 12,393,471 B2
(45) Date of Patent: Aug. 19, 2025

(54) METHODS AND APPARATUS TO ALIGN MEDIA WORKLOADS

(71) Applicant: Intel Corporation, Santa Clara, CA (US)

(72) Inventors: Charu Srivastava, Danville, CA (US); Changliang Wang, Bellevue, WA (US); Srikanth Potluri, Folsom, CA (US); Nir Gerber, Haifa (IL); Qixiong Bian, Beaverton, OR (US); Stanley Baran, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 908 days.

(21) Appl. No.: 17/359,308

(22) Filed: Jun. 25, 2021

(65) Prior Publication Data

US 2021/0326191 A1  Oct. 21, 2021

(51) Int. Cl.
*G06F 13/10* (2006.01)
*G06F 9/54* (2006.01)
*G06F 13/40* (2006.01)

(52) U.S. Cl.
CPC .......... *G06F 9/542* (2013.01); *G06F 13/4068* (2013.01)

(58) Field of Classification Search
CPC ..... G06F 9/542; G06F 13/4068; G06F 1/3228
See application file for complete search history.

(56) References Cited

U.S. PATENT DOCUMENTS 10,810,471 B1   10/2020 Perumalla et al.
11,290,959 B1*  3/2022 Nirantar ................ H04L 67/288

| 2005/0240752 A1* | 10/2005 | Yokoi ................... G06F 9/4881 712/1 |
| 2012/0081567 A1* | 4/2012 | Cote ................... H04N 21/4223 348/222.1 |
| 2014/0270722 A1 | 9/2014 | Wang et al. |
| 2014/0362162 A1 | 12/2014 | Chung et al. |

(Continued)

OTHER PUBLICATIONS

International Searching Authority, "International Preliminary Report on Patentability," issued in connection with International Patent Application No. PCT/US2022/022185, mailed on Jan. 4, 2024, 5 pages.

(Continued)

*Primary Examiner* — Kevin L Young
*Assistant Examiner* — Abdou K Seye
(74) *Attorney, Agent, or Firm* — Hanley, Flight & Zimmerman, LLC

(57) ABSTRACT

Methods, apparatus, systems, and articles of manufacture are disclosed to align processing events. An example apparatus includes a comparator to compare a value of a counter to a threshold value, the threshold value associated with an amount of time to defer provision of a first or second input signal to a corresponding first or second IP device, respectively, signal deferring circuitry to defer provision of the first or second input signals to a corresponding one of the first or second IP devices based on an output of the comparator, deferral of the first or second input signals to cause alignment of first and second processing events performed by the first and second IP devices, respectively, and power controlling circuitry to cause the first and second IP devices to power down based on completion of the first and second processing events.

22 Claims, 16 Drawing Sheets

(56) References Cited

U.S. PATENT DOCUMENTS

2015/0317762 A1   11/2015  Park et al.
2018/0284836 A1*  10/2018  Daanen ..................... G06F 1/12
2020/0145578 A1    5/2020  Lin et al.
2021/0326191 A1   10/2021  Srivastava et al.
2022/0301095 A1*   9/2022  Dagani ..................... G06T 1/20

OTHER PUBLICATIONS

Patent Cooperation Treaty "International Search Report and Written Opinion" issued in related International Application No. PCT/US2022/022185, dated Jul. 14, 2022, 9 pages.

\* cited by examiner

METHODS AND APPARATUS TO ALIGN MEDIA WORKLOADS

FIELD OF THE DISCLOSURE

This disclosure relates generally to media workloads and, more particularly, to methods and apparatus to align media workloads.

BACKGROUND

During operation of an electronic user device (e.g., a laptop, a tablet, etc.), hardware components of the device, such as a processor, a graphics card, etc. enter low power states when they are not active (e.g., processing a workload). Package residency of electronic user devices measures an amount of time one or more cores/components on a system on a chip (SOC), etc. are active and consuming power.

BRIEF DESCRIPTION OF THE DRAWINGS

The figures are not to scale. In general, the same reference numbers will be used throughout the drawing(s) and accompanying written description to refer to the same or like parts.

Figure 1:
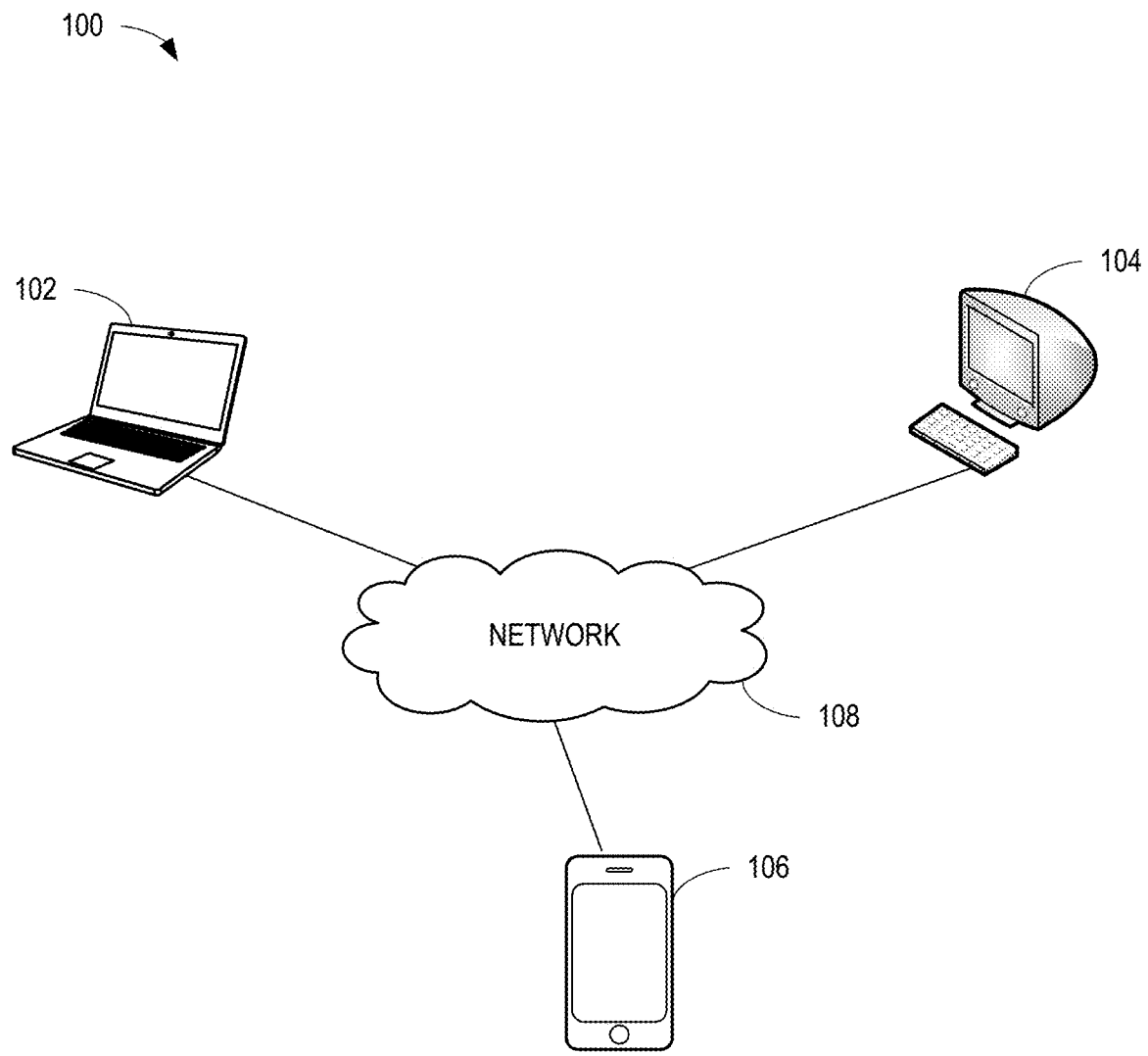
FIG. 1 is a block diagram of an example environment including example user devices in which the teachings of this disclosure may be implemented.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Media workloads such as video collaboration applications can consume a high amount of power. Power consumption is an important design consideration, particularly for portable devices that are powered by a battery. For example, a high power consumption can decrease end-user experience and battery life and can raise the temperature of components that implement the video collaboration applications. Such a rise in temperature can have the unwelcome side-effect of adversely impacting performance of such components.

In at least some previous computing devices, processing performed by different components in the media workload pipeline (sometimes referred to herein as "IP devices") is not synchronized and occurs at different intervals. That is, the IP devices consume power at different intervals, and, thus, the computing device cannot enter lower power states or can enter lower power states for only small amounts of time. For example, some IP devices, such as an image signal processor (ISP) (sometimes referred to herein as an "image processing unit (IPU)"), include a power gating feature. As used herein, "power gating" refers to a time period when an IP device enters a low power state. For example, power gating of the ISP can save 100 mW during video conferencing. However, because other IP devices of the user device such as a central processing unit (CPU), a graphics processing unit (GPU), an audio device, a network device, and/or a display device are not power gated at the same time, the computing device has a high package residency. As used herein, a "package residency" refers to the overall time one or more cores and/or components of the computing device are active and consuming power. Additionally or alternatively, longer staged pipelines of video conferencing applications can increase the latency (e.g., by one frame, etc.). Thus, end-to-end latency requirements (e.g., photon to preview, mouth to ear, etc.) may be violated.

In some examples, a video conferencing application requests data frames. For example, the data frames can include audio data and/or video data. A camera of the user device begins capturing the video frames for processing in response to the request. In some examples, the user device includes an ISP. The ISP can process the frames captured by the camera. For example, the ISP generates output data to three buffer streams: an example neural network processing unit (NPU), an example media block, and an example graphics execution unit. In some examples, the NPU is implemented by a vision processing unit (VPU). For example, the NPU processing unit performs AI processing on the frame data, the media block encodes the frame data, and the graphics execution unit performs display composition using the frame data.

Methods, apparatus, and systems for media workload alignment are disclosed herein. For example, processing on IP devices of a computing device, as disclosed herein, can be aligned to reduce latency and increase power savings. Example techniques disclosed herein include receiving input signals corresponding to the IP devices of the computing device. Disclosed techniques also include generating a count corresponding to the input signals and determining a threshold value associated with the input signals. For example, the threshold values of the input signals indicate a duration to delay output of the input signals to the IP devices. Disclosed techniques further include delaying transmission of the output signals corresponding to the input signals based on a comparison of the counts and the thresholds.

FIG. 1 is a block diagram of an example environment 100 including example user devices in which the teachings of this disclosure may be implemented. The example environment 100 includes an example first user device 102, an example second user device 104, and an example third user device 106. In some examples, the user devices 102, 104, 106 execute a video conferencing application. However, in examples disclosed herein, the user devices 102, 104, 106 can execute any media workload (e.g., presenting media, etc.). For example, the user device 102 is a laptop, the user device 104 is a desktop computer, and the user device 106 is a smartphone, and thus, capable of video conferencing. While the illustrated example of FIG. 1 includes three user devices, examples disclosed herein are not limited thereto. For example, there can be any combination and number of laptops, desktops, and smartphones. In examples disclosed herein, user devices can also include tablets, etc.

In examples disclosed herein, the user devices 102, 104, 106 include IP devices. For example, the user devices 102, 104, 106 include a camera, an ISP, an artificial intelligence (AI) engine, a GPU, a media engine, an audio device, a display device, etc. In some examples of video conferencing applications, the camera captures frames and transmits the frames to the ISP for processing (e.g., face detection, temporal noise reduction (TNR), auto-focus, auto-exposure, auto-white-balance (3A), etc.). The ISP can generate a downscaled output frame in red-green-blue planar (RGBP) format. In some examples, the AI engine obtains the RGBP format frame to perform background segmentation and outputs a foreground/background mask. The GPU can obtain the segmentation mask generated by the AI engine and the original, full resolution frame generated by the ISP to perform background blurring and/or replacement. In some examples, the media engine obtains the output of the GPU and encodes and sends a compressed bitstream for mixing with audio and real-time transport (RTP) packetization. The RTP packetized stream is sent to the network stack for transmission (e.g., to other user devices of the video conferencing application).

In examples disclosed herein, the user devices 102, 104, 106 align the processing of media workloads of the respective IP devices. In some examples, the processing of media workloads are referred to as processing events. For example, the execution of media workloads on the IP devices of the user device 102 (e.g., the ISP, the CPU, the GPU, etc.) are aligned. Thus, examples disclosed herein lower the Package-C residency and frame latency during media workloads, and thus, lower the SOC power consumption. In some examples, the processing events of one frame corresponds to 33 ms. In some examples, the IP components divide the processing time into 11 ms (or any other desired duration). In some examples disclosed herein, the input signals of the IP components are aligned to the start of the frame in the manners described below. Examples disclosed herein reduce the package residency and power consumption. For example, the package residency of the user devices 102, 104, 106 is reduced during multimedia conferencing In the illustrated example of FIG. 1, the environment 100 includes an example network 108. The example network 108 is a network used to transmit data between the user devices 102, 104, 106. For example, the network transmits video data and/or audio data to and/or from the user devices 102, 104, 106. In some examples, the network 108 can be the Internet or any other suitable external network. Additionally or alternatively, any other suitable means of transmitting the data between the user devices 102, 104, 106 can be used.

Figure 2:
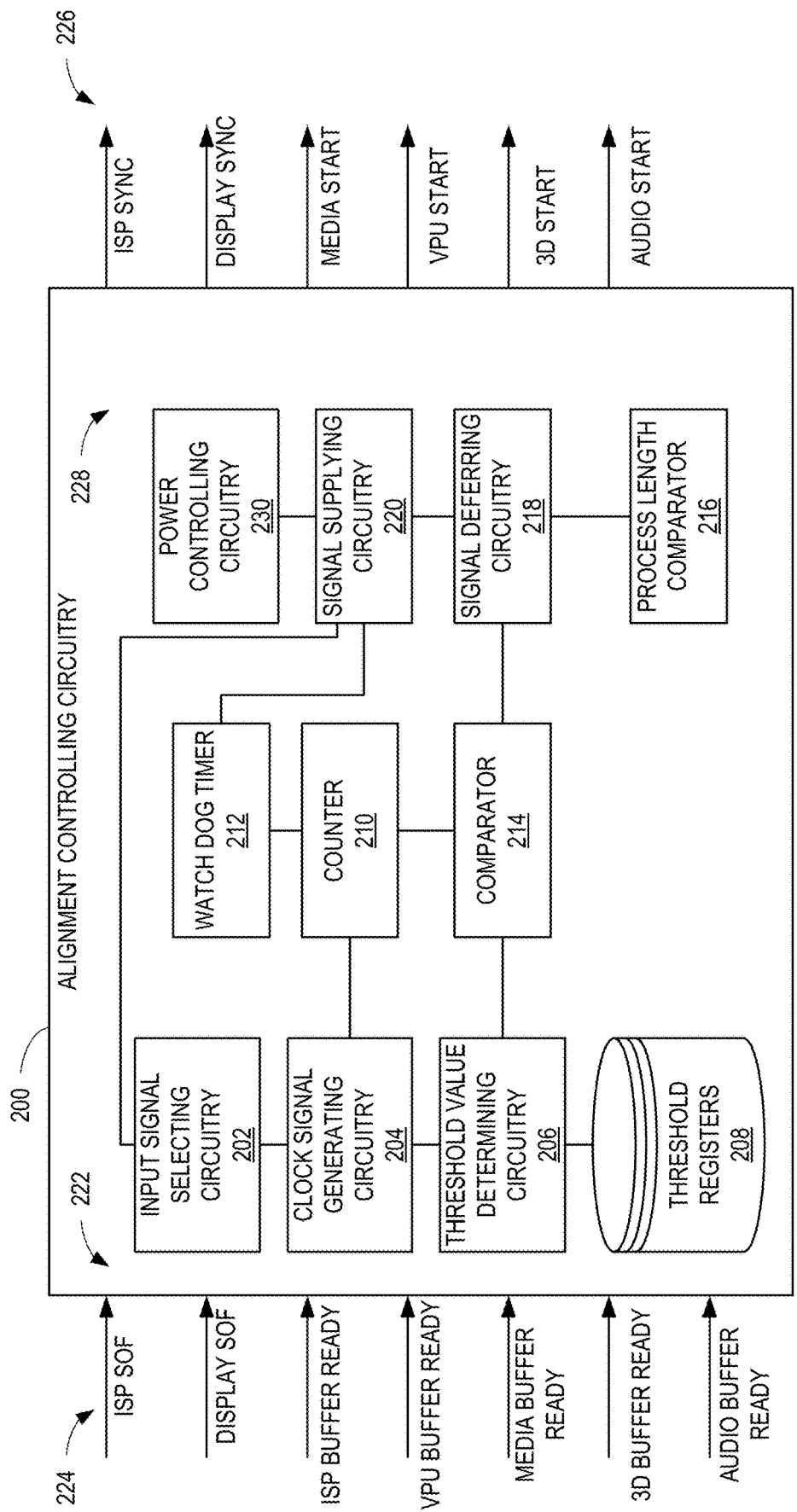
FIG. 2 is a block diagram of an example implementation of an alignment controlling circuitry included in the user devices of FIG. 1.

FIG. 2 is a block diagram of an example implementation of alignment controlling circuitry 200 included in the example user devices 102, 104, 106 of FIG. 1. The example alignment controlling circuitry 200 includes example input signal selecting circuitry 202, example clock signal generating circuitry 204, example threshold value determining circuitry 206, example threshold registers 208, an example counter 210, an example comparator 214, an example process length comparator 216, example signal deferring circuitry 218, example signal supplying circuitry 220, and example power controlling circuitry 230.

The example alignment controlling circuitry 200 includes example input ports 222. For example, the input ports 222 correspond to signals generated by IP devices of the computing devices 102, 104, 106. For example, the input ports 222 receive example input signals 224. In the illustrated example of FIG. 2, the input signals 224 include an ISP start of frame (SOF) signal, a display SOF signal, an ISP buffer ready signal, a VPU buffer ready signal, a media buffer ready signal, a 3D buffer ready signal, and an audio buffer ready signal. In some examples, the IP devices generate the input signals 224 during execution of a video conference application.

The example input signal selecting circuitry 202 selects a signal from the input signals 224 received via the input ports 222. For example, the input signal selecting circuitry 202 selects a reference signal. As used herein, a "reference signal" refers to a signal that is used to determine a delay. For example, the alignment controlling circuitry 200 aligns the input signals based on the reference signal. In some examples, the alignment controlling circuitry 200 receives the ISP SOF signal and the display SOF signal via the input ports 222. The example input signal selecting circuitry 202 selects the ISP SOF signal or the display SOF signal as the reference signal. For example, if the input signal selecting circuitry 202 selects the ISP SOF signal to be the reference signal, the alignment controlling circuitry 200 aligns the display SOF signal processing to the ISP SOF signal processing. In this manner, the cadence of the operation of the input devices are the same. For example, the cadence corresponding to the ISP SOF signal and the display SOF signal are the same (e.g., 33 ms, etc.).

The example clock signal generating circuitry 204 generates a clock signal. In some examples, the clock signal generating circuitry 204 operates based on a clock signal that uses a same crystal and that is shared among the IP devices of the user device. As a result, the IP devices are operating at the same cadence. Additionally or alternatively, input signals 224 supplied to the alignment controlling circuitry 200 each use different reference clocks. In some such examples, the clocks of the IP devices of the user device are not operating at a same cadence and are not synced. In such examples, the clock signal generating circuitry 204 selects an input signal to generate the clock signal. In some examples, the clock signal generating circuitry 204 selects the input signal based on the reference signal selected by the input signal selecting circuitry 202. For example, the clock signal generating circuitry 204 determines a selected start time.

The example threshold value determining circuitry 206 determines thresholds associated with the input signals 224. In examples disclosed herein, the thresholds determine amounts of time that transmission of corresponding ones of the input signals 224 is to be delayed by the alignment controlling circuitry 200. In some examples, the threshold value determining circuitry 206 determines the threshold of an input signal based on a difference between the time of arrival (TOA) of the input signal and the TOA of the reference signal (e.g., selected by the input signal selecting circuitry 202). As used herein, the "time of arrival" of the input signal is the time the signal is received by the alignment controlling circuitry 200 with respect to the start of an interval. For example, the start of the interval corresponds to the start of a frame, the selected start time, etc. In some examples, the input signals 224 are associated with different thresholds. For example, the thresholds associated with the input signals 224 are based on the TOA difference between the respective signal and the reference signal.

In some examples, the thresholds are predetermined. For example, the threshold registers 208 store and/or otherwise hold threshold values associated with the input signals 224 that were determined during a prior execution of media workloads (e.g., during configuration of the user devices 102, 104, 106). That is, in some examples the input signals 224 are associated with an expected TOA based on data collected during the prior execution of the media workloads. In some such examples, the example threshold value determining circuitry 206 determines the threshold of an input signal based on a difference between the expected TOA of the input signal and the reference signal. The threshold, when reached by the counter, is used to indicate that a corresponding one of the input signals is to be released as a corresponding one of the output signals of the alignment controlling circuitry 200.

In some examples, the thresholds are not predetermined. For example, the threshold registers 208 do not store thresholds determined based on a prior media workload process. In such examples, the threshold value determining circuitry 206 determines the TOA of the input signals 224 when the alignment controlling circuitry 200 receives the input signals 224. For example, the alignment controlling circuitry 200 receives a first input signal at a first time. The alignment controlling circuitry 200 receives a second input signal at a second time. Thus, the threshold value determining circuitry 206 determines a difference in the times of arrival of the first and second input signals. In some examples, the threshold value determining circuitry 206 stores the thresholds of the input signals 224 in the threshold registers 208.

For example, the VPU buffer ready signal and the media buffer ready signal of the input signals 224 can have the same cadence of 33 ms. However, the input signal selecting circuitry 202 receives the media buffer ready signal 5 ms after receiving the VPU buffer ready signal. Thus, the threshold value determining circuitry 206 determines the expected TOA difference between the VPU buffer ready signal and the media buffer ready signal is 5 ms. The example threshold registers 208 store a threshold associated with the media buffer ready signal of 5 ms.

In some such examples, the VPU buffer ready signal can be in synch with the start of an interval. In some such examples, the threshold represents the amount of time between the arrival of the VPU buffer ready signal and the media buffer ready signal, which as disclosed above can be 5 ms (or any other value depending on the times of arrival of the input signals 224 at the input of the alignment controlling circuitry 200). In some such examples, to align the start of a first processing event associated with the VPU IP device and a second processing event associated with the media IP device, the operation of the VPU IP delayed deferring the start signal of the VPU buffer from being provided as an output signal until the value in the counter 210 matches or exceeds the threshold value (e.g., 5 ms). When the value in the counter 210 and threshold value are equal or approximately equal, the input signal provided by the VPU buffer is provided as an output signal of the alignment controlling circuitry 200 and the input signal supplied by the media buffer is provided/released as an output signal of the alignment controlling circuitry 200 at a same time. Thus, the input signals corresponding to the VPU buffer and media buffer are supplied, at the same time, as output signals corresponding to an input signal of the VPU IP device and an input of the media IP device, respectively. In this manner the VPU IP device and media device operate to start performing a first processing event and a second processing event, respectively, at a same time.

The example threshold registers 208 store thresholds. For example, the thresholds correspond to amounts of time by which various ones of the input signals 224 are to be delayed. As disclosed above, the thresholds can be determined during a previous operation of the workloads by the IP devices or can be determined during processing of a first slice of a media frame. As used herein, for example purposes only, the media frame can have a duration of 33 ms and each slice can have a duration of ⅓ of the frame duration or 11 ms. The example threshold registers 208 of the illustrated example of FIG. 2 are implemented by any memory, storage device and/or storage disc for storing data such as, for example, flash memory, magnetic media, optical media, solid state memory, hard drive(s), thumb drive(s), etc. Furthermore, the data stored in the example threshold registers 208 may be in any data format such as, for example, binary data, comma delimited data, tab delimited data, structured query language (SQL) structures, etc. While, in the illustrated example, the threshold registers 208 are illustrated as a single device, the example threshold registers 208 and/or any other data storage devices described herein may be implemented by any number and/or type(s) of memories.

In some examples, the example counter 210 generates counts associated with the input signals 224. For example, the counter 210 begins a count for the input signals 224 based on the selected start time generated by the example clock signal generating circuitry 204. In some examples, the count corresponds to the duration an input signal has been delayed by the alignment controlling circuitry 200. In some examples, after a first slice of the media frame is processed, the thresholds can be increased by an amount of time equal to the amount of time to be used as a threshold during the processing of a second slice of the media frame.

In some examples, the example watch dog timer 212 determines whether the TOA of any of the input signals 224 exceeds respective expiration times of the input signals 224. For example, the watch dog timer 212 stores expiration times corresponding to the input signals 224. In some examples, the expiration times correspond to latency requirements of the video conferencing application. For example, if the TOA of an input signal exceeds the expiration time, the video conferencing application may drop a frame, violate latency requirements, drop audio, etc. In some examples, the input signals 224 are associated with different expiration times. If the watch dog timer 212 determines the TOA of the input signal (e.g., corresponding to the count of the input signal) exceeds the expiration time, the watch dog timer 212 flags the input signal for transmission. That is, the alignment controlling circuitry 200 determines to not align the processing of the input signal to thereby avoid violating latency requirements.

As disclosed above, when the threshold values and corresponding counts of the input signals are equal (or approximately equal) one or more of the corresponding input signals are provided by/released to corresponding example outputs of the alignment controlling circuitry 200. To determine when a count value is equal to (or approximately equal to a corresponding threshold) the example comparator 214 compares thresholds and counts of the input signals 224. That is, the comparator 214 compares the count of an input signal determined by the example counter 210 to the corresponding threshold stored in the threshold registers 208. In some examples, the comparator 214 determines the count is less than the threshold. If the comparator 214 determines the count is less than the threshold, the counter 210 continues to increment the count value of the input signal. Additionally or alternatively, the comparator 214 determines that the count of the input signal is greater than or equal to the threshold. In some examples, the comparator 214 outputs the determination to the signal deferring circuitry 218 which responds to the comparator output by either further deferring release of a corresponding one of the input signals or by indicating the corresponding one of the input signals is to be released as an output signal coupled to an input of a corresponding IP device.

In some examples, the alignment controlling circuitry 200 operates to cause the processing events performed by corresponding ones of the IP devices to be performed within a predetermined duration of time. In some examples, the predetermined length of time corresponds to the processing event associated with a longest duration. In some such examples, the example process length comparator 216 compares the processing event times associating with corresponding ones of the IP devices. For example, the process length comparator 216 determines the duration of processing events performed by corresponding ones of the IP devices. In some examples, the durations of ones of the processing events which begins at release of a corresponding one of the input signals to a corresponding one of the output ports 228 is predetermined. In some such examples, the durations of the processing events is identified during workload processing performed at an earlier time. In some examples, the process length comparator 216 identifies the input signal corresponding to the processing event having the relatively longest duration. In some examples, the process length comparator 216 outputs the determination to the signal deferring circuitry 218.

The example uses the output of the signal deferring circuitry 218 to control release of the input signals based on the duration of the processing events. For example, the signal deferring circuitry 218 receives the output of the comparator 214. If the comparator 214 determines the count of an input signal is less than the threshold of the input signal, the signal deferring circuitry 218 flags the input signal to be delayed. For example, the signal deferring circuitry 218 defers provision of the input signal and the counter 210 increments the count of the input signal. Additionally or alternatively, the signal deferring circuitry 218 determines the count of the input signal is greater than or equal to the threshold. When the comparator 214 determines the count of the input signal is greater than or equal to the threshold, the signal deferring circuitry 218 flags the input signal for transmission to a corresponding one of the IP devices.

In some examples, the signal deferring circuitry 218 flags the input signal with a residency delay. For example, the signal deferring circuitry 218 flags the input signal with a residency delay if the comparator 214 determines the count of an input signal is greater than or equal to the threshold of the input signal and the process length comparator 216 determines the input signal is not the input signal corresponding to the longest processing time. That is, in some examples, the signal deferring circuitry 218 determines to delay an input signal corresponding to an IP device such that the IP device completes a processing event at the same time (or before) the processing event having the longest duration is completed. For example, the completion time of the processing events of the IP devices is the same. For example, the signal deferring circuitry 218 determines to increase the threshold associated with an input signal based on the duration of a difference between the corresponding processing events and the processing event having the longest duration. In some examples, the threshold(s) are set such that all of the corresponding input signals are delayed and the completion of the processing events associated with each of the IP devices occur at a same time. In some examples, the signal deferring circuitry 218 does not flag the input signal with a residency delay. For example, the signal deferring circuitry 218 can determine that the output of a first IP device is to be supplied to as an input to a second IP device. In some examples, the processing time needed by the first IP device to generate the output signal impacts a start time of the second IP device. In some such examples, the user device (e.g., the user devices 102, 104, 106) is to finish a first processing event performed by the first IP device before the resulting output signal can be supplied to the second input device for use by the second IP device in performing a second processing event. In some such examples, the start time of the second IP device is scheduled to be delayed until the resulting output signal of the first IP device is ready to be supplied as an input signal to the alignment controlling circuitry 200. In some examples, the second IP device can begin processing the output data of the first IP device as the output data is generated without waiting until the first IP device has completed the first processing event. In some such examples, the second IP device can be delayed by an amount of time taken for at least some of the output data of the first IP device to be generated, as described further below.

In some examples, the signal supplying circuitry 220 responds to signals supplied by the example watch dog timer 212 and/or the example signal deferring circuitry 218. The example signal supplying circuitry 220 generates output signals. For example, the signal supplying circuitry 220 generates example output signals 226 corresponding to the input signals 224. In the illustrated example of FIG. 2, the output signals 226 include an ISP sync signal, a display sync signal, a media start signal, a VPU start signal, a 3D start signal, and an audio start signal. In some examples, the signal supplying circuitry 220 generates the output signals 226 in response to determining the signal deferring circuitry 218 and/or the watch dog timer 212 flagged the input signals 224 for transmission to the corresponding IP devices. The example signal supplying circuitry 220 causes the output signals 226 to be transmitted to the IP devices via example output ports 228. In some examples, each output signal corresponds to an output port.

Figure 3:
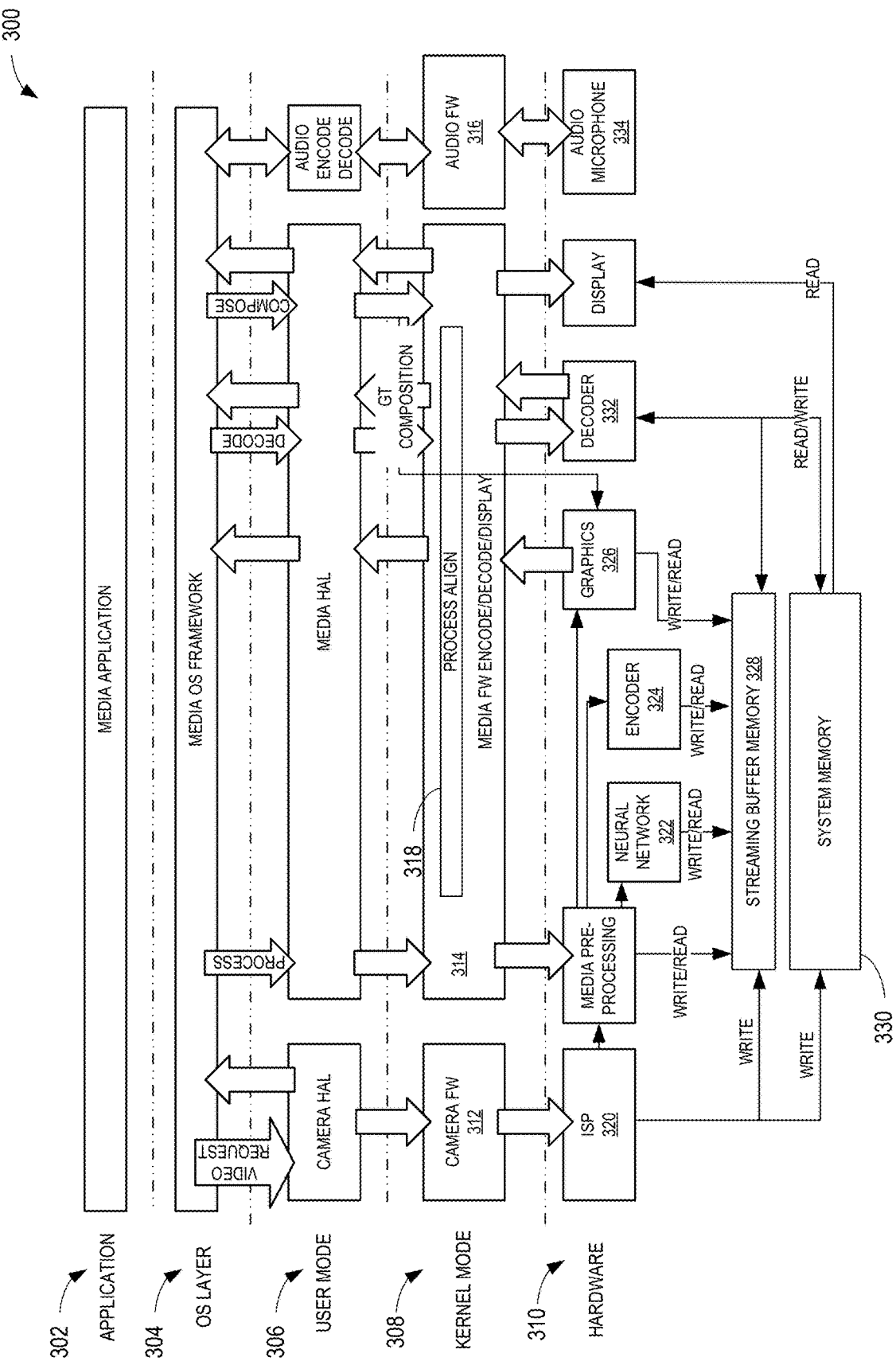
FIG. 3 illustrates an example alignment architecture.

FIG. 3 illustrates an example alignment architecture 300. For example, the user devices 102, 104, 106 (FIG. 1) implement the alignment architecture 300. The example alignment architecture 300 includes an example application layer 302, an example operating system (OS) layer 304, an example user mode layer 306, an example kernel mode layer 308, and an example hardware layer 310. In some examples, the alignment architecture 300 aligns processing of the IP devices of user devices during video conferencing. For example, the media application of the application layer 302 is a video conferencing application. The example user mode layer 306 includes example hardware abstraction layers (HALs). For example, the user mode layer 306 includes an example camera HAL and an example media HAL. The example kernel mode layer 308 includes an example camera firmware 312, an example media firmware 314, and an example audio firmware 316. In the illustrated example of FIG. 3, the media firmware 314 includes an example process align block 318. In some examples, the process align block 318 receives the output signals 226 (FIG. 2). Additionally or alternatively, the example camera firmware 312 and/or the example audio firmware 316 includes the example process align block 318.

In operation, the video conferencing application of the application layer 302 requests video frames and the camera of the user device begins capturing the frame for processing based on the output signals 226. The example hardware layer 310 includes an example ISP 320. For example, the ISP 320 processes the frame captured by the camera. In the illustrated example of FIG. 3, the ISP generates output data to three buffer streams: an example neural network 322, an example encoder 324, and an example graphics circuitry 326. In some examples, the neural network 322 performs AI processing on the frame data, the encoder 324 encodes the frame data, and the graphics circuitry 326 performs display composition using the frame data. In examples disclosed herein, the processing performed by the neural network 322, the encoder 324, and the graphics circuitry 326 are aligned based on the output signals 226 generated by the alignment controlling circuitry 200 (FIG. 2).

In some examples, the neural network 322, the encoder 324, and the graphics circuitry 326 read from and/or write data to an example streaming buffer memory 328. In some examples, the streaming buffer memory 328 is a near memory, a cache, etc. For example, the neural network 322 processes a first slice of the frame and stores the output in the streaming buffer memory 328. The encoder 324 accesses the output of the neural network 322 stored in the streaming buffer memory 328 and begins processing before the neural network 322 finishes processing the entire frame. Thus, the alignment architecture 300 supports low latency and shared residency. Additionally or alternatively, the neural network 322, the encoder 324, and the graphics circuitry 326 read from and/or write data to an example system memory 330. In some examples, the system memory 330 is Double Data Rate (DDR) memory.

In examples disclosed herein, outstream processing of the alignment architecture 300 is completed within the first ⅓ of the frame time. In some examples, the frame time refers to a total amount of time to process the frame. A bit stream for video decode is copied to contiguous system memory (e.g., the streaming buffer memory 328 and/or the system memory 330). The example alignment architecture 300 aligns the decode operations (e.g., a first decode operation is queued based on the output signals 226 of the alignment controlling circuitry 200). For example, if a decode operation queues before the output signals 226 are transmitted, the decode operation completes in the first ⅓ of the frame time. If the decode operation queues after the output signals 226 are transmitted, the decode operations are delayed to process in the subsequent frame time (e.g., second ⅓ of the frame time).

The example alignment architecture 300 includes an example decoder 332 and an example audio microphone 334. In some examples disclosed herein, the decoder 332 and the audio microphone 334 are aligned with the operation of the ISP 320, the neural network 322, the encoder 324, and/or the graphics circuitry 326. For example, audio packets are buffered by the alignment controlling circuitry 200 to align processing three audio packets per frame by the audio microphone 334. In some such examples, a microphone of the user device captures audio at 10 ms interrupts for echo cancellation. In some examples, the audio render packets are offloaded to a digital signal processor (DSP) (not illustrated) for encoding/decoding processing. Thus, the CPU (not illustrated) of the user device remains idle, thereby lowering package residency.

Figure 4:
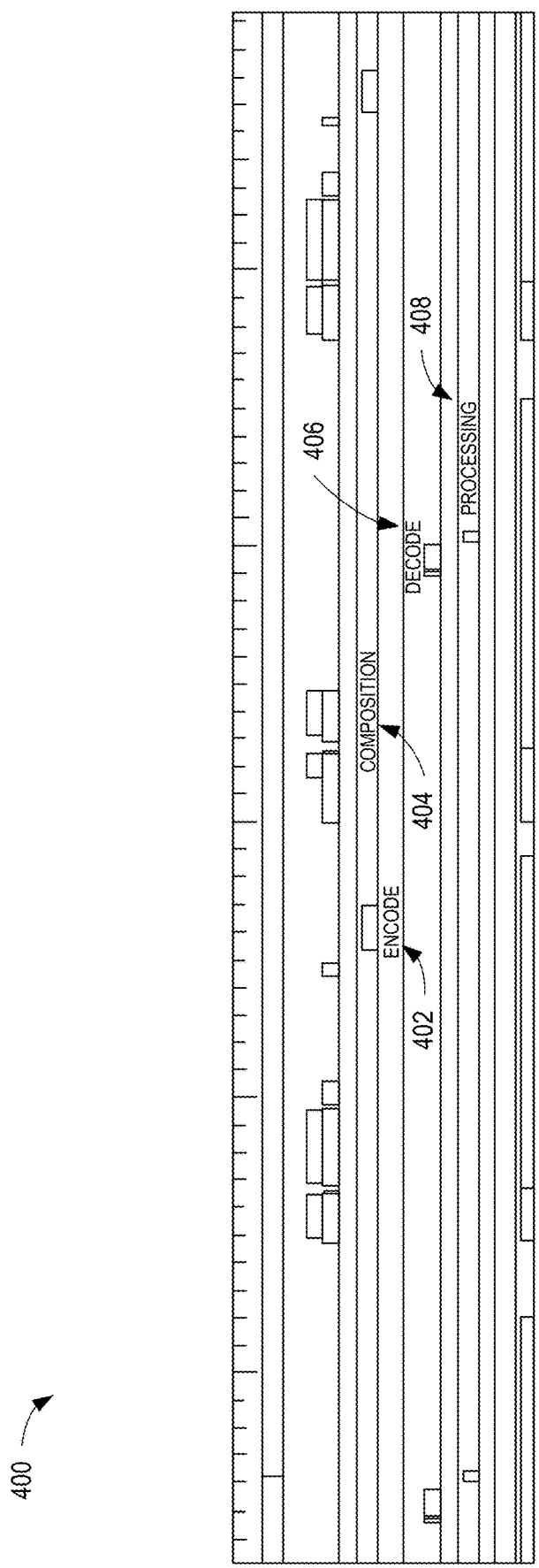
FIG. 4 illustrates an example timing diagram of unaligned processes of a graphics processing unit (GPU).

FIG. 4 illustrates an example timing diagram 400 of unaligned processes of a GPU. For example, the timing diagram 400 includes unsynchronized processing events. The processing events include an example encode process 402, an example composition process 404, an example decode process 406, and an example processing 408. The example processes 402, 404, 406, 408 occur at different times. That is, the processes 402, 404, 406, 408 are not aligned. As a result, the GPU does not enter a low power state and the package residency of the user device is relatively high.

Figure 5A:
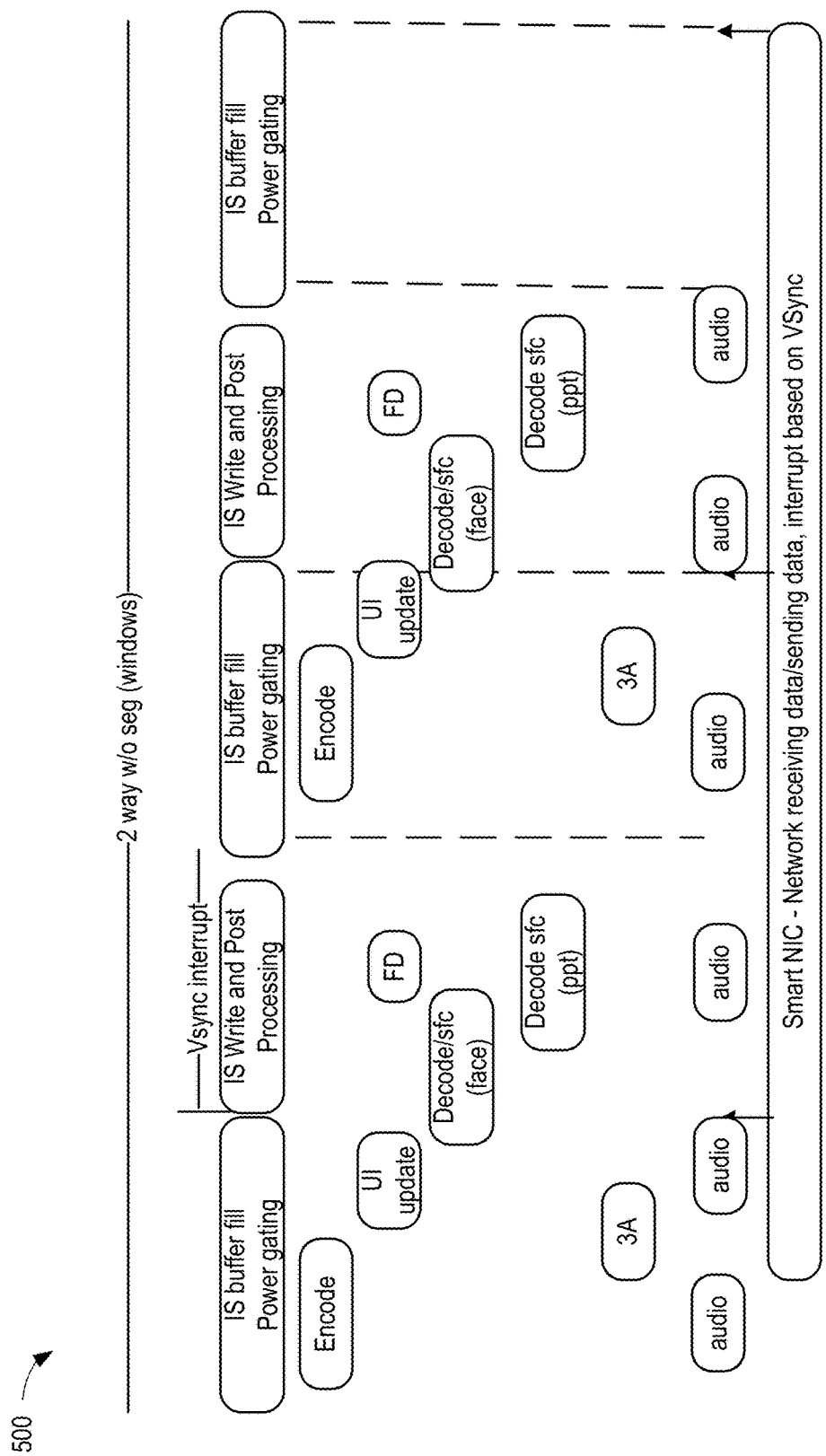
FIGS. 5A-5B illustrate example timing diagrams of a processing event-based video application.

FIG. 5A illustrates an example timing diagram 500 of a processing event-based video application. In the illustrated example of FIG. 5A, the processing events of the ISP are aligned and the processing events of the CPU and/or GPU are not aligned. For example, the ISP initiates frame capture of the video application and the CPU, GPU, audio circuitry, neural network accelerator, and/or network processing circuitry are not aligned in hardware or software. For example, the ISP begins processing events at frame refresh boundaries and aligns processing by pipelining (e.g., each stage in the pipeline is processing data generated in a previous frame). Thus, the ISP is power gated. However, the CPU and GPU are not power gated, and thus, do not reduce power consumption. For example, the CPU performs an encode processing event while the ISP is power gated. In the illustrated example of FIG. 5, the processing events include encoding, user interface (UI) update processing, decoding, face detection processing, 3A processing, and audio processing.

Figure 5B:
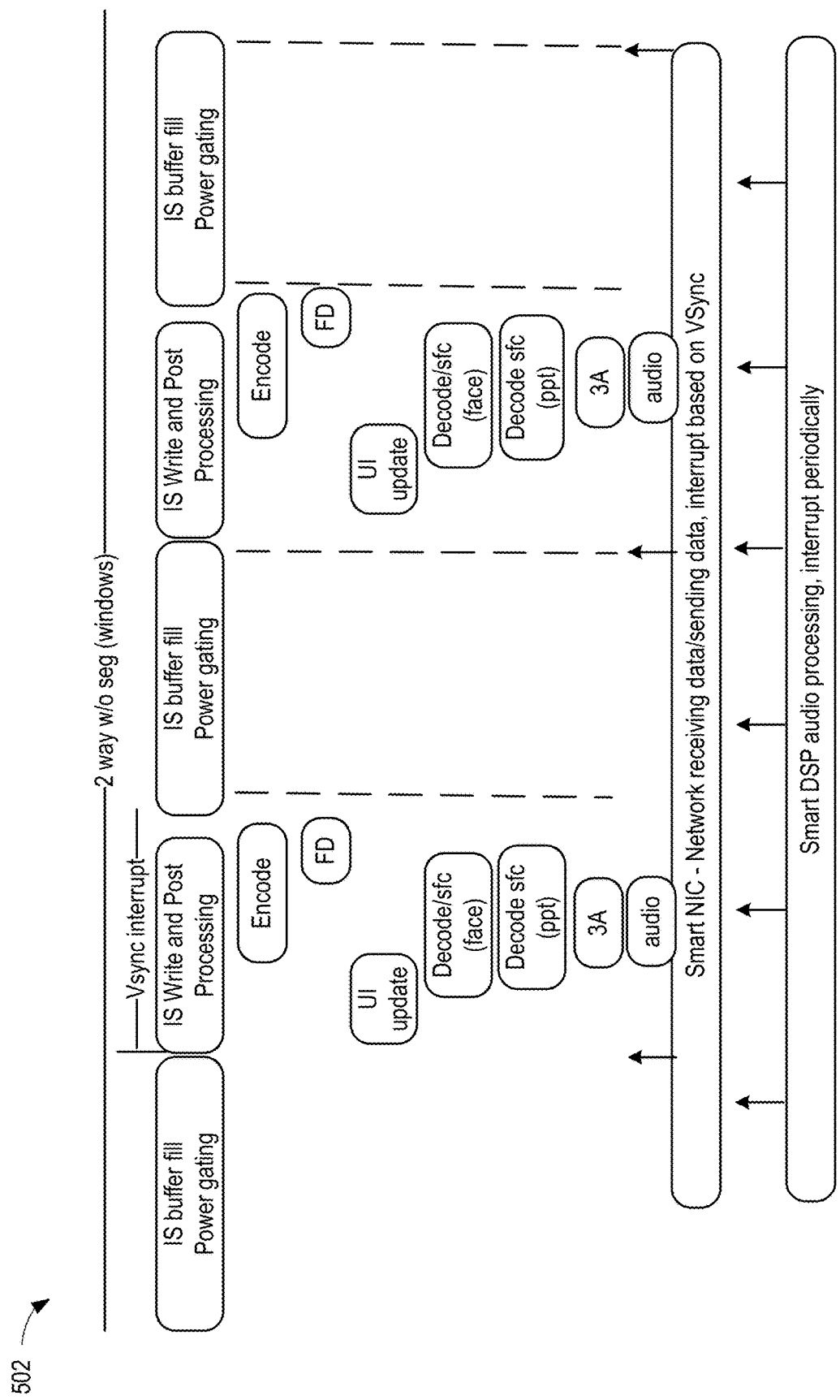

FIG. 5B illustrates an example timing diagram 502 of a processing event-based video application. In some examples, the processing events of the IP components aligned. For example, the processing events of the ISP, CPU, GPU, audio circuitry, neural network accelerator, and/or network processing circuitry are aligned. For example, the GPU performs an encode processing event at a relatively later time in FIG. 5A compared to FIG. 5B. That is, the CPU and the GPU do not execute processing events during the time when the ISP is power gated. In some examples, the CPU and/or the GPU are in an idle state when the ISP is power gated. For example, during the idle state, the CPU and/or GPU reduce access to system memory, and, thus, reduce power consumption.

Figure 6:
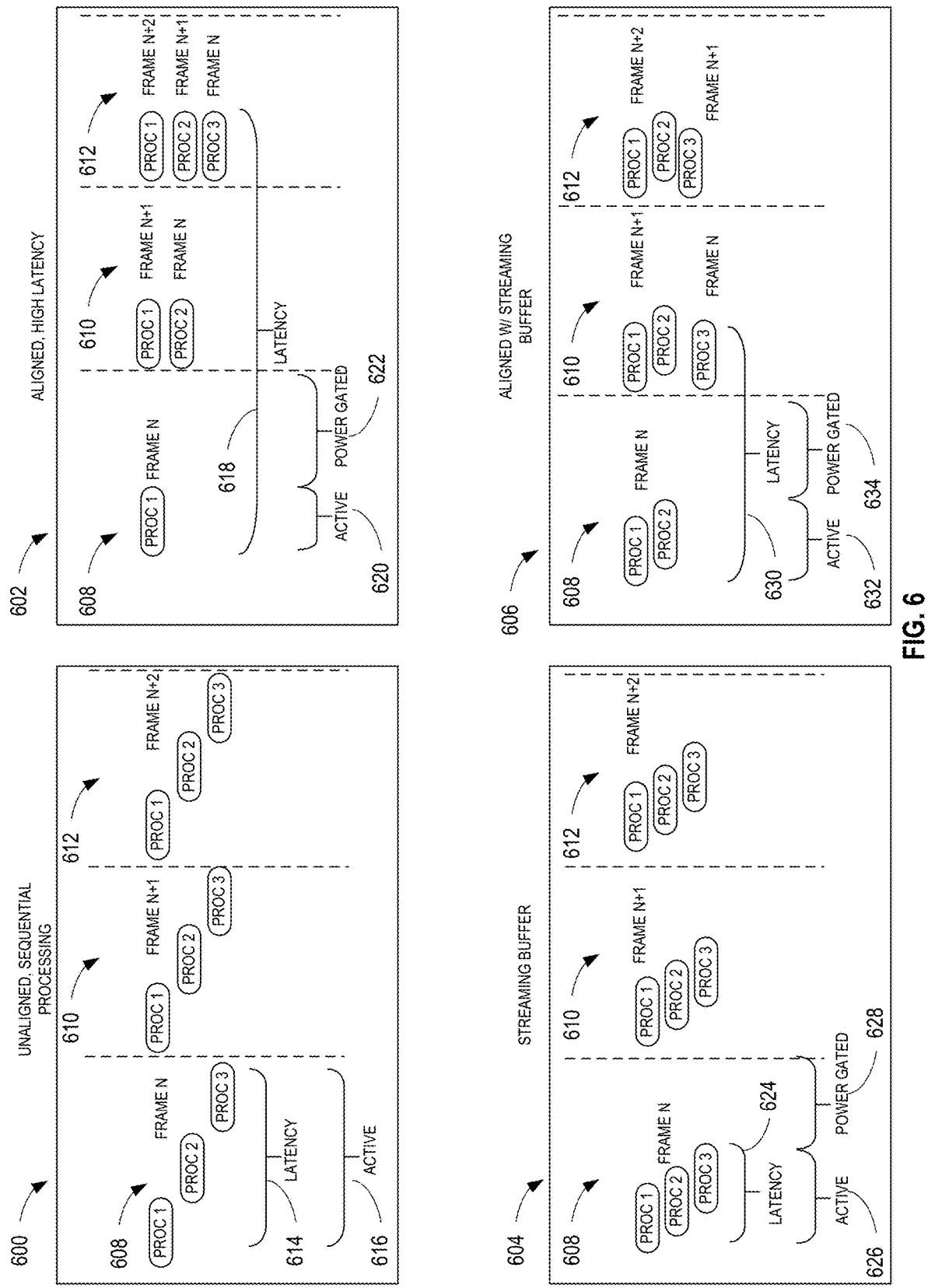
FIG. 6 illustrates example timing diagrams.

FIG. 6 illustrates an example first timing diagram 600, an example second timing diagram 602, an example third timing diagram 604, and an example fourth timing diagram 606. The example timing diagrams 600, 602, 604, 606 include an example first frame time 608, an example second frame time 610, and an example third frame time 612. The example timing diagrams 600, 602, 604, 606 include an example process 1, an example process 2, and an example process 3. For example, the processes 1, 2, 3 correspond to processing events of video conferencing applications.

The example first timing diagram 600 corresponds to the processing events of the IP devices being unaligned. That is, the IP devices process the processing events sequentially. For example, the first frame time 608 corresponds to processing frame N, the second frame time 610 corresponds to processing frame N+1, and the third frame time 612 corresponds to processing frame N+2. The first timing diagram 600 has an example first latency 614. The latency 614 corresponds to the duration of the frame times 608, 610, 612. That is, the IP devices finish processing one frame in one frame time. The first timing diagram 600 has an example active period 616. For example, the IP devices corresponding to the first timing diagram 600 are active for the duration of the frame times 608, 610, 612. That is, the IP devices are not power gated and have a high package residency.

The example second timing diagram 602 corresponds to the processing events of the IP devices being aligned. For example, the IP devices perform the processing events at the start of the frame times 608, 610, 612. For example, process 1 of frame N occurs at the start of the first frame time 608. For example, process 1 of frame N+1 and process 2 of frame N occurs at the start of the second frame time 610. For example, process 1 of frame N+2, process 2 of frame N+1, and process 3 of frame N occurs at the start of the third frame time 612. Thus, the second timing diagram 602 has an example second latency 618. In the illustrated example of FIG. 6, the second latency 618 is greater than the first latency 614. In some examples, the second latency 618 violates the latency requirement of the video conferencing application (e.g., the latency 618 exceeds the latency requirement).

The second timing diagram 602 has an example second active period 620. The example second active period 620 corresponds to the processing time of process 1. That is, the second active period 620 is relatively shorter than the first active period 616 of the first timing diagram 600. Thus, the second timing diagram 602 has an example first power gated period 622. In examples disclosed herein, the sum of the duration of the active period and the power gated period (e.g., the active period 620 and the power gated period 622) equal the frame time (e.g., the first frame time 608).

The example third timing diagram 604 corresponds to the processing events of the IP devices implementing a streaming buffer (e.g., the near memory 328 of FIG. 3). For example, similar to the first timing diagram 600, the IP devices execute process 1, process 2, and process 3 of frame N in the first frame time 608. The IP devices execute process 1, process 2, and process 3 of frame N+1 in the second frame time 610. The IP devices execute process 1, process 2, and process 3 of frame N+2 in the third frame time 612. However, the processing times of process 1, process 2, and process 3 of the third timing diagram 604 overlap. That is, the IP devices execute process 1 on a first slice of frame N and store the output in a streaming buffer. The IP devices access the output stored in the streaming buffer and execute process 2 while process 1 is executing on subsequent slices of frame N. Thus, the third timing diagram 604 has an example third latency 624. In the illustrated example of FIG. 6, the third latency 624 is less than the first latency 614 and the second latency 618.

The third timing diagram 604 has an example third active period 626 and an example second power gated period 628. The example third active period 626 is less than the first active period 616 and greater than the second active period 620. However, as described above, the third latency 624 is less than the second latency 618 and does not violate the latency requirements.

The example fourth timing diagram 606 corresponds to aligned processing events of the IP devices implementing a streaming buffer. That is, the fourth timing diagram 606 corresponds to example techniques disclosed herein. For example, the IP devices execute process 1 and process 2 of frame N in the first frame time 608. In the illustrated example of FIG. 6, process 1 and process 2 of the fourth timing diagram 606 overlap. The IP devices execute process 1 and process 2 of frame N+1 and process 3 of frame N in the second frame time 610. In the second frame time 610 of the fourth timing diagram 606, process 1 of frame N+1 and process 3 of frame N are aligned. The IP devices execute process 1 and process 2 of frame N+2 and process 3 of frame N+1 in the third frame time 612. Thus, the fourth timing diagram 606 has an example fourth latency 630. In the illustrated example of FIG. 6, the fourth latency 630 is greater than the first latency 614 and the third latency 624 but less than the second latency 618.

The example fourth timing diagram 606 has an example fourth active period 632 and an example third power gated period 634. The example fourth active period 632 is less than the first active period 616 and the third active period 626, but greater than the second active period 620. However, the fourth latency 630 does not violate the latency requirements and the fourth active period 632 is less than the third active period 626.

Figure 7:
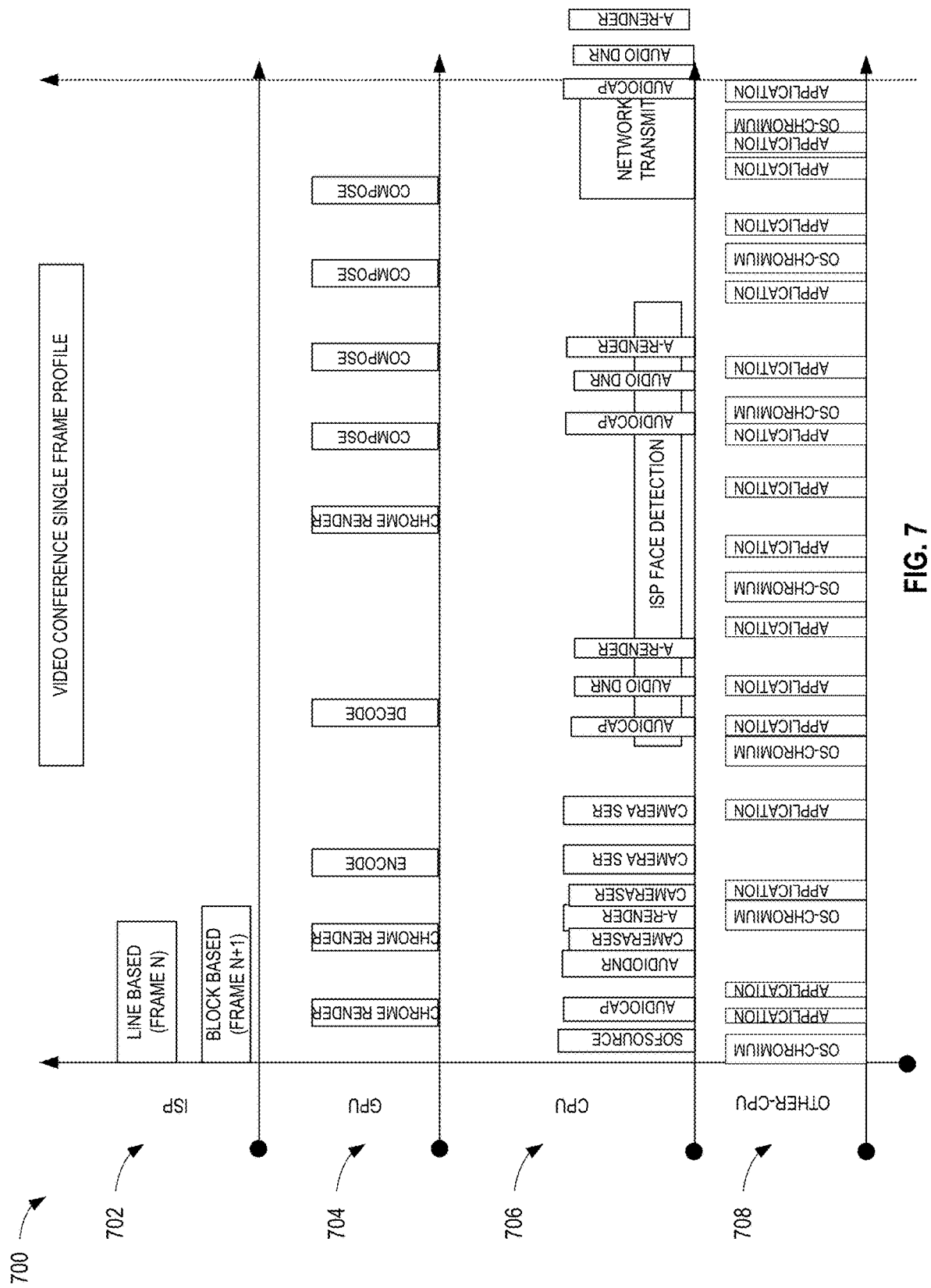
FIG. 7 illustrates an example timing diagram of an unaligned video conferencing application.

FIG. 7 illustrates an example timing diagram 700 of a video conferencing application. For example, the timing diagram 700 corresponds to a 30 frames per second (fps) video conferencing workload. The timing diagram 700 includes processing events corresponding to an example ISP 702, an example GPU 704, an example first CPU 706, and an example second CPU 708. For example, the timing diagram 700 includes processing events for one frame. In the illustrated example of FIG. 7, the processing events of the ISP 702, the GPU 704, and the CPUs 706, 708 are not aligned. For example, the ISP 702 executes two processing events that are aligned. That is, the ISP 702 executes the two processing events at the start of the frame time and enters a power gating period. However, the processing events of the GPU 704 and the CPUs 706, 708 are not aligned and occur during the duration of the frame time. In the illustrated example of FIG. 7, the timing diagrams corresponding to the GPU 704 and the CPUs 706, 708 do not include a power gating period. Thus, a user device including the ISP 702, the GPU 704, and the CPUs 706, 708 has a high package residency.

Figure 8:
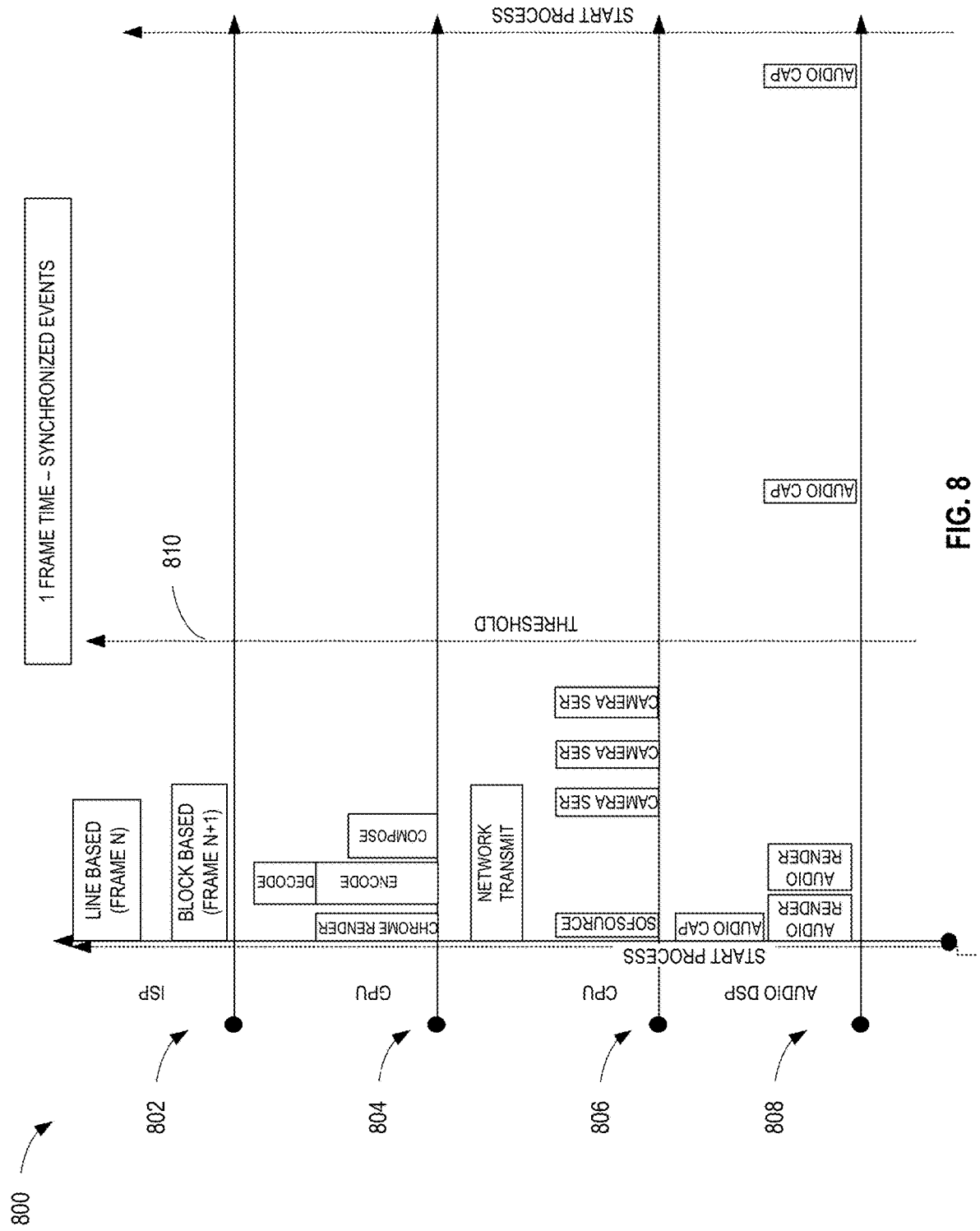
FIG. 8 illustrates an example timing diagram of an aligned video conferencing application.

FIG. 8 illustrates an example timing diagram 800 of a video conferencing application. The timing diagram 800 includes processing events corresponding to an example ISP 802, an example GPU 804, an example CPU 806, and an example audio DSP 808. For example, the timing diagram 800 includes processing events for one frame. In the illustrated example of FIG. 8, the processing events of the ISP 802, the GPU 804, the CPU 806, and the audio DSP 808 are aligned. For example, the ISP 802, the GPU 804, the CPU 806, and the audio DSP 808 execute processing events at the start of the frame time. Thus, the timing diagrams of the ISP 802, the GPU 804, and the CPU 806 include a power gating period. For example, the illustrated example of FIG. 8 includes an example threshold 810. In some examples, the threshold 810 corresponds to the start of the power gating period. In some examples, the IP devices finish executing the processing events within ⅓ of the frame time (e.g., the threshold 810 occurs at ⅓ of the frame time), resulting in a 40% reduction in the active period and a 30% reduction in the core active period of the user device.

Figure 9:
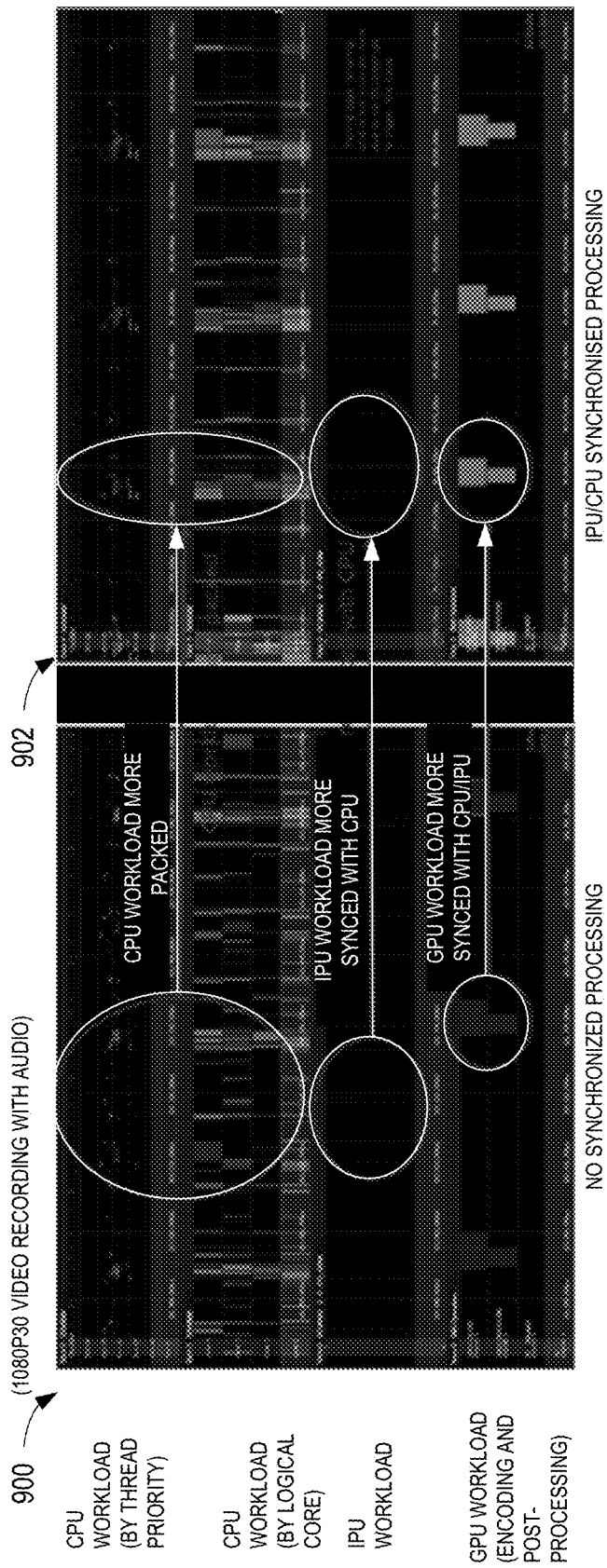
FIG. 9 illustrates example first and second timing diagrams of example workloads of a video conferencing application.

FIG. 9 illustrates an example first timing diagram 900 and an example second timing diagram 902 of example workloads of a video conferencing application. The example timing diagrams 900 include CPU workloads, IPU workloads, and GPU workloads. The workloads of the first timing diagram 900 are not aligned. For example, the workloads of the CPU, the IPU, and the GPU are executed throughout the frame times. The workloads of the example second timing diagram 902 are aligned. For example, the CPU processes the workloads at the start of the frame. Further, the GPU processes the workloads at the same start of the frame as the CPU. Thus, the CPU, IPU, and GPU can enter a power gating period and decrease the package residency of the user device. That is, the alignment and streaming buffer decreased the package and core residency for video conferencing without audio and with audio. Thus, the example user devices described herein reduce power consumption for video conferencing applications.

The example power controlling circuitry 230 causes the IP components to power down in response to completing the processing events corresponding to the output signals 226. For example, the power controlling circuitry 230 transmits a signal to the IP components to cause the IP components to generate a power gating period and/or an idle period. That is, after the IP components complete the respective processing events, the IP components power down. Additionally or alternatively, the example alignment controlling circuitry 200 does not include the power controlling circuitry 230. In some such examples, the IP components power down in response to completing the processing events until there is a wake event (e.g., subsequent processing events).

In some examples, the alignment controlling circuitry 200 includes means for selecting an input signal. For example, the means for selecting an input signal may be implemented by the example input signal selecting circuitry 202. In some examples, the input signal selecting circuitry 202 may be implemented by machine executable instructions such as that implemented by at least blocks 1002, 1004 of FIG. 10 executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the input signal selecting circuitry 202 is implemented by other hardware logic circuitry, hardware implemented state machines, and/or any other combination of hardware, software, and/or firmware. For example, the input signal selecting circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the alignment controlling circuitry 200 includes means for generating a clock signal. For example, the means for generating a clock signal may be implemented by the example clock signal generating circuitry 204. In some examples, the clock signal generating circuitry 204 may be implemented by machine executable instructions such as that implemented by at least block 1006 of FIG. 10 executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the clock signal generating circuitry 204 is implemented by other hardware logic circuitry, hardware implemented state machines, and/ or any other combination of hardware, software, and/or firmware. For example, the clock signal generating circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the alignment controlling circuitry 200 includes means for determining a threshold. For example, the means for determining a threshold may be implemented by example threshold value determining circuitry 206. In some examples, the threshold value determining circuitry 206 may be implemented by machine executable instructions such as that implemented by at least blocks 1008 of FIG. 10, 1102, 1104, 1106, 1108, 1110, 1112 of FIG. 11 executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the threshold value determining circuitry 206 is implemented by other hardware logic circuitry, hardware implemented state machines, and/or any other combination of hardware, software, and/or firmware. For example, the threshold value determining circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the alignment controlling circuitry 200 includes means for counting. For example, the means for counting may be implemented by the example counter 210. In some examples, the counter 210 may be implemented by machine executable instructions such as that implemented by at least block 1010 of FIG. 10 executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the counter 210 is implemented by other hardware logic circuitry, hardware implemented state machines, and/or any other combination of hardware, software, and/or firmware. For example, the counter 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the alignment controlling circuitry 200 includes means for determining an expiration time. For example, the means for determining an expiration time may be implemented by the example watch dog timer 212. In some examples, the watch dog timer 212 may be implemented by machine executable instructions such as that implemented by at least block 1012 of FIG. 10 executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the watch dog timer 212 is implemented by other hardware logic circuitry, hardware implemented state machines, and/or any other combination of hardware, software, and/or firmware. For example, the watch dog timer 212 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the alignment controlling circuitry 200 includes means for comparing. For example, the means for comparing may be implemented by the example comparator 214. In some examples, the comparator 214 may be implemented by machine executable instructions such as that implemented by at least block 1014 of FIG. 10 executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the comparator 214 is implemented by other hardware logic circuitry, hardware implemented state machines, and/or any other combination of hardware, software, and/or firmware. For example, the comparator 214 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the alignment controlling circuitry 200 includes means for deferring signals. For example, the means for deferring signals may be implemented by the example signal deferring circuitry 218. In some examples, the signal deferring circuitry 218 may be implemented by machine executable instructions such as that implemented by at least blocks 1016, 1018, 1022, 1026 of FIG. 10 executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the signal deferring circuitry 218 is implemented by other hardware logic circuitry, hardware implemented state machines, and/or any other combination of hardware, software, and/or firmware. For example, the signal deferring circuitry 218 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the alignment controlling circuitry 200 includes means for transmitting a signal. For example, the means for transmitting a signal may be implemented by the example signal supplying circuitry 220. In some examples, the signal supplying circuitry 220 may be implemented by machine executable instructions such as that implemented by at least block 1024 of FIG. 10 executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the signal supplying circuitry 220 is implemented by other hardware logic circuitry, hardware implemented state machines, and/or any other combination of hardware, software, and/or firmware. For example, the signal supplying circuitry 220 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the alignment controlling circuitry 200 includes means for controlling power. For example, the means for controlling power may be implemented by the example power controlling circuitry 230. In some examples, the power controlling circuitry 230 may be implemented by machine executable instructions such as that implemented by at least block 1024 of FIG. 10 executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the power controlling circuitry 230 is implemented by other hardware logic circuitry, hardware implemented state machines, and/or any other combination of hardware, software, and/or firmware. For example, the power controlling circuitry 230 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the alignment controlling circuitry 200 of FIG. 2 is illustrated in FIG. 2, one or more of the elements, processes, and/or devices illustrated in FIG. 2 may be combined, divided, re-arranged, omitted, eliminated, and/or implemented in any other way. Further, the example input signal selecting circuitry 202, the example clock signal generating circuitry 204, the example threshold value determining circuitry 206, the example threshold registers 208, the example counter 210, the example watch dog timer 212, the example comparator 214, the example process length comparator 216, the example signal deferring circuitry 218, the example signal supplying circuitry 220, the example power controlling circuitry 230, and/or, more generally, the example alignment controlling circuitry 200 of FIG. 2, may be implemented by hardware, software, firmware, and/or any combination of hardware, software, and/or firmware. Thus, for example, any of the example input signal selecting circuitry 202, the example clock signal generating circuitry 204, the example threshold value determining circuitry 206, the example threshold registers 208, the example counter 210, the example watch dog timer 212, the example comparator 214, the example process length comparator 216, the example signal deferring circuitry 218, the example signal supplying circuitry 220, the example power controlling circuitry 230, and/or, more generally, the example alignment controlling circuitry 200, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example input signal selecting circuitry 202, the example clock signal generating circuitry 204, the example threshold value determining circuitry 206, the example threshold registers 208, the example counter 210, the example watch dog timer 212, the example comparator 214, the example process length comparator 216, the example signal deferring circuitry 218, the example signal supplying circuitry 220, the example power controlling circuitry 230, and/or the example alignment controlling circuitry 200 is/are hereby expressly defined to include a non-transitory computer readable storage device or storage disk such as a memory, a digital versatile disk (DVD), a compact disk (CD), a Blu-ray disk, etc., including the software and/or firmware. Further still, the example alignment controlling circuitry 200 of FIG. 2 may include one or more elements, processes, and/or devices in addition to, or instead of, those illustrated in FIG. 2, and/or may include more than one of any or all of the illustrated elements, processes and devices.

Figure 10:
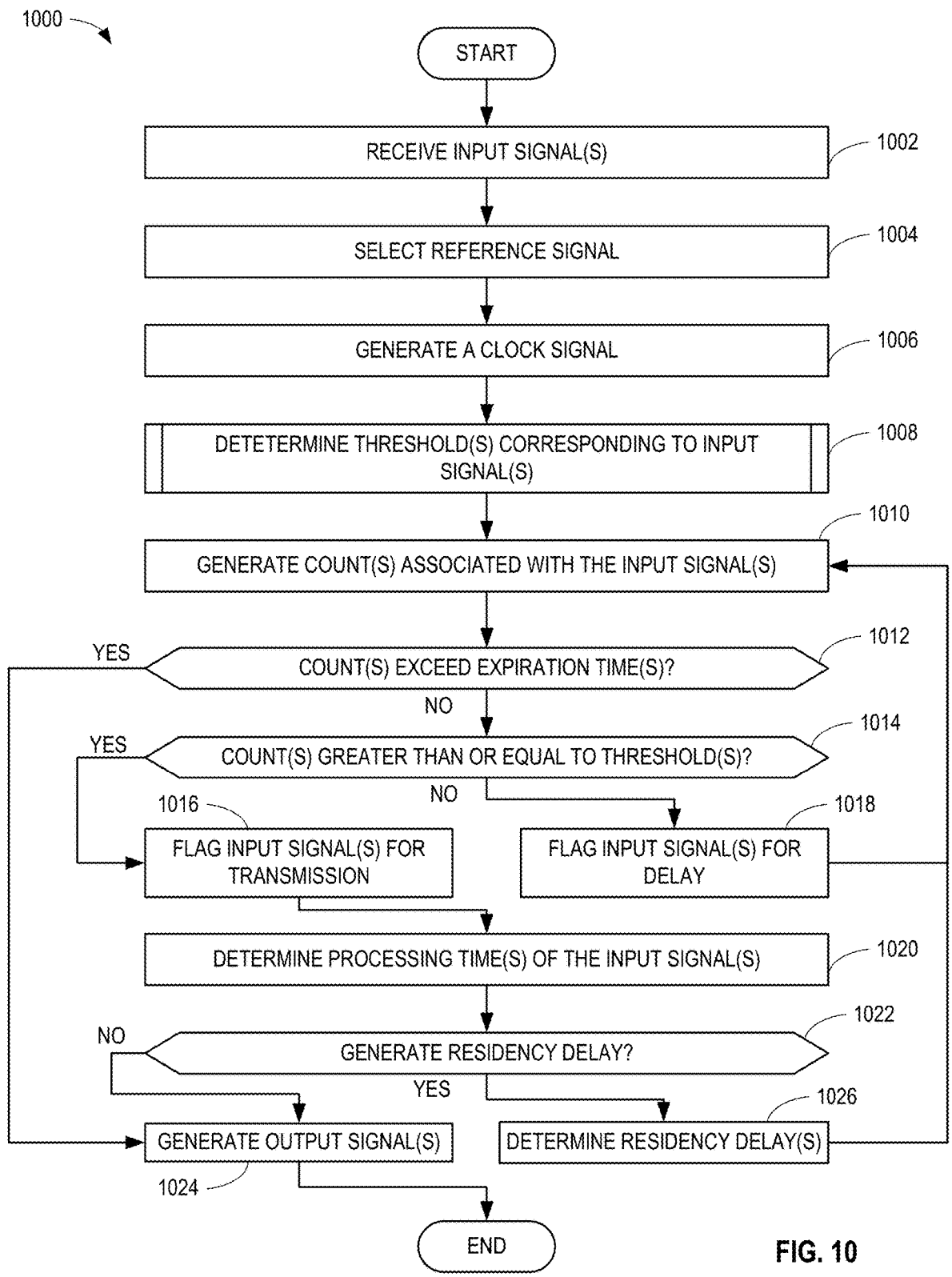
FIG. 10 is a flowchart representative of example machine readable instructions that may be executed by example processor circuitry to implement the example alignment controlling circuitry of FIG. 2.
Figure 11:
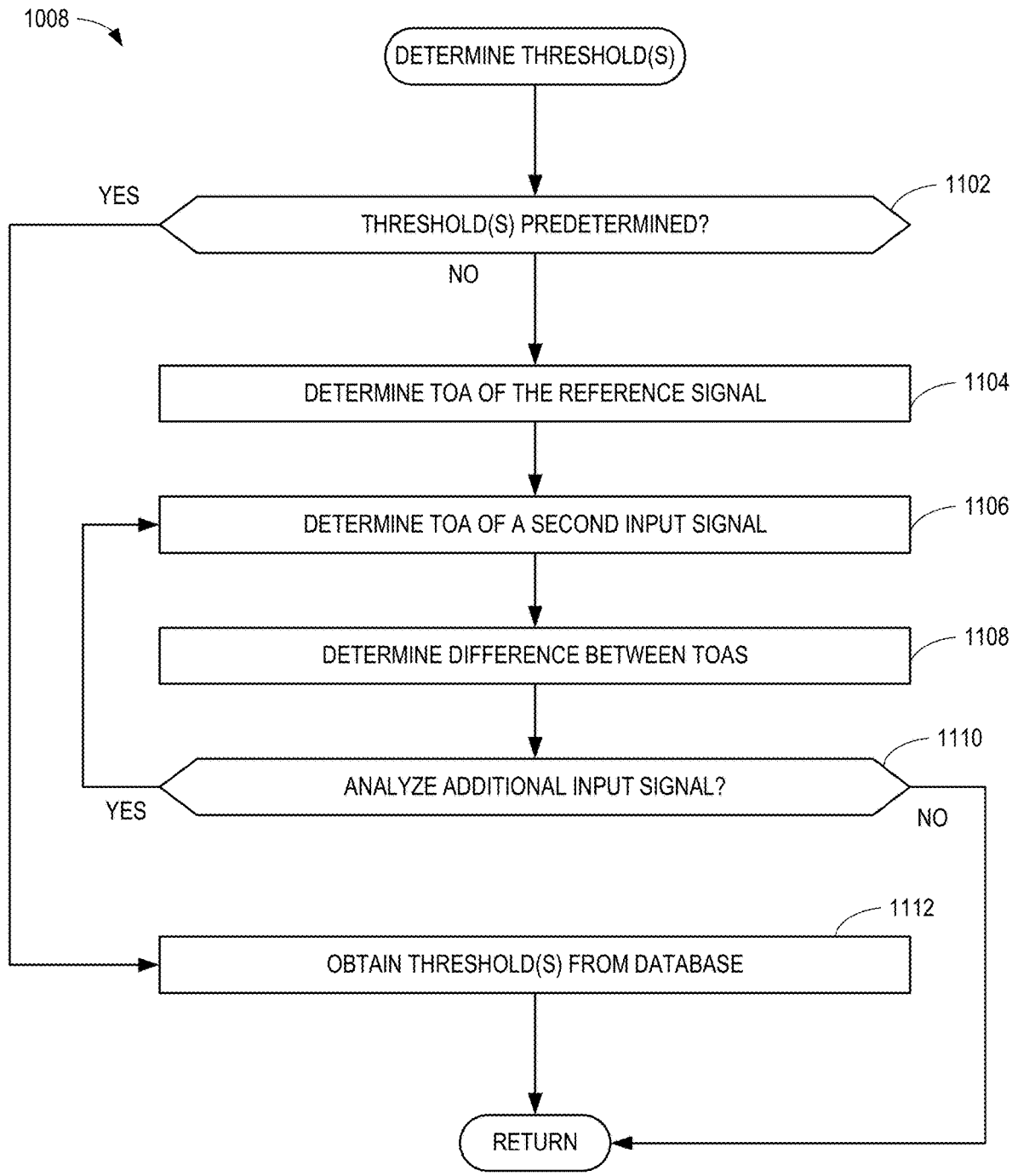
FIG. 11 is a flowchart representative of example machine readable instructions that may be executed by example processor circuitry to implement the example threshold value determining circuitry of FIG. 2.

Flowcharts representative of example hardware logic circuitry, machine readable instructions, hardware implemented state machines, and/or any combination thereof for implementing the alignment controlling circuitry 200 of FIG. 2 are shown in FIGS. 10-11. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 13 and/or 14. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 12, many other methods of implementing the example alignment controlling circuitry 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 10-11 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 10 is a flowchart representative of example machine readable instructions and/or example operations 1000 that may be executed and/or instantiated by processor circuitry to align workloads. The machine readable instructions and/or operations 1000 of FIG. 10 begin at block 1002, at which the example input signal selecting circuitry 202 (FIG. 2) receives input signal(s). For example, the input signal selecting circuitry 202 receives the input signals 224 (FIG. 2) via the input ports 222 (FIG. 2).

At block 1004, the example input signal selecting circuitry 202 selects a reference signal. For example, the input signal selecting circuitry 202 selects one of the input signals 224 to be the reference signal. For example, the input signal selecting circuitry 202 receives an ISP SOF signal and a display SOF signal. The input signal selecting circuitry 202 selects one of the ISP SOF signal or the display SOF signal as the reference signal.

At block 1006, the example clock signal generating circuitry 204 (FIG. 2) generates a clock signal. For example, the clock signal generating circuitry 204 determines whether the input signal(s) are associated with the same crystal. In some examples, the clock signal indicates a selected start time.

At block 1008, the threshold value determining circuitry 206 (FIG. 2) determines threshold(s) corresponding to the input signal(s). For example, the threshold value determining circuitry 206 determines whether the threshold(s) are predetermined values. If the threshold value determining circuitry 206 determines the threshold(s) are not predetermined, the threshold value determining circuitry 206 determines threshold(s) based on differences between TOAs of the input signal(s). Example operations that may be used to implement block 1008 to determine threshold(s) are described in more detail below in connection with FIG. 11.

At block 1010, the example counter 210 (FIG. 2) generates count(s) associated with the input signal(s). For example, the counter 210 increments a count associated with one of the input signal(s). In some examples, the counter 210 begins the count at the selected start time determined at block 1006. In some examples, the counter 210 generates a count for each of the input signal(s).

At block 1012, the example watch dog timer 212 (FIG. 2) determines whether the count(s) exceed expiration time(s). For example, the watch dog timer 212 compares the count(s) to corresponding expiration time(s) associated with the input signal(s). In some examples, the expiration time(s) are based on latency requirements of a video conferencing application. If the example watch dog timer 212 determines the count(s) exceed the expiration time(s), the operations 1000 proceed to block 1024. If the example watch dog timer 212 determines the count(s) do not exceed the expiration time(s), at block 1014, the example comparator 214 (FIG. 2) determines whether the count(s) are greater than or equal to the threshold(s). For example, the comparator 214 compares the count(s) to the corresponding threshold(s) stored in the threshold registers 208 (FIG. 2).

If the comparator 214 determines the count(s) are greater than or equal to the corresponding threshold(s), at block 1016, the example signal deferring circuitry 218 (FIG. 2) flags the corresponding input signal(s) for transmission as output signals to a corresponding one of the IP devices. The operations 1000 proceed to block 1020. If the comparator 214 determines the count(s) are not greater than or equal to the corresponding threshold(s), at block 1018, the signal deferring circuitry 218 flags the input signal(s) for delay. That is, the signal deferring circuitry 218 determines to continue to delay transmission of the input signal(s) as output signals until the threshold is reached as determined by subsequent iterations of one or more of the operations 1000. The operations 1000 return to block 1010, at which the example counter 210 increments the count of the input signal(s).

At block 1020, the example process length comparator 216 (FIG. 2) determines the processing time(s) of the input signal(s). For example, the process length comparator 216 determines the input signal associated with a longest processing time. In some examples, the processing times required for corresponding ones of the IP devices to process corresponding ones of the input signal(s) supplied as output signals are predetermined.

At block 1022, the example signal deferring circuitry 218 determines whether to generate a residency delay. For example, a residency delay aligns the times at which a one or more of the input signal(s) are supplied as output signals to corresponding IP devices based on a length of time needed for the corresponding IP devices to complete corresponding processing events. In some examples, the signal deferring circuitry 218 determines whether to generate a residency delay based on whether the output of a first process is used as input for a second process. If the example signal deferring circuitry 218 determines to not generate a residency delay, at block 1024, the example signal supplying circuitry 220 (FIG. 2) generates output signal(s). For example, the signal supplying circuitry 220 generates output signal(s) corresponding to the input signal(s). In some examples, the signal supplying circuitry 220 transmits the output signal(s) to the corresponding IP devices of the input signal(s). Additionally or alternatively, the example power controlling circuitry 230 (FIG. 2) generates an output signal to cause the IP components to power down in response to completing the respective processing events.

Returning to block 1022, if the example signal deferring circuitry 218 is programmed to generate a residency delay, at block 1026, the example signal deferring circuitry 218 determines the residency delay. For example, the signal deferring circuitry 218 determines the residency delay based on the difference between times associated with processing the input signal(s) to identify the process associated with the longest processing time (e.g., determined at block 1020). In some examples, the signal deferring circuitry 218 adjusts the threshold(s) of that will affect when one or more of the input signal(s) are supplied as output signals based on the delay(s) needed to achieve the lowest overall residency time of the application (e.g., based on the longest processing time). The operations 1000 return to block 1010, at which the example counter 210 increments the count associated with the input signal(s).

FIG. 11 is a flowchart representative of example machine readable instructions and/or example operations 1008 that may be executed and/or instantiated by processor circuitry to determine threshold(s). The machine readable instructions and/or operations 1008 of FIG. 11 begin at block 1102, at which the example threshold value determining circuitry 206 (FIG. 2) determines whether the threshold(s) are predetermined. In some examples, the threshold(s) are predetermined based on prior processing of media workloads during video conferencing applications. For example, the threshold value determining circuitry 206 determines whether the threshold registers 208 (FIG. 2) contains corresponding threshold(s) values associated with the corresponding input signal(s). If so, the threshold values (or copies thereof) are transferred to corresponding ones of the threshold registers 208.

If the example threshold value determining circuitry 206 determines the threshold(s) are predetermined, the operations 1008 proceed to block 1110. If the example threshold value determining circuitry 206 determines the threshold(s) are not predetermined, at block 1104, the example threshold value determining circuitry 206 determines the TOA of the reference signal. For example, the threshold value determining circuitry 206 determines the TOA of the reference signal (see block 1004 of FIG. 10).

At block 1106, the example threshold value determining circuitry 206 determines the TOA of a second input signal. For example, the threshold value determining circuitry 206 selects one of the input signal(s) and determines the TOA of the input signal. In some examples, the TOA of the reference signal and/or the input signal(s) is based on the selected start time determined at block 1006 of FIG. 10.

At block 1108, the example threshold value determining circuitry 206 determines a difference between the TOA of the reference signal and the TOA of the second input signal. For example, the difference corresponds to the time difference of when the reference signal and the second signal were received by the example alignment controlling circuitry 200 (FIG. 2). In some examples, the threshold value determining circuitry 206 stores the difference associated with the second input signal in the threshold registers 208.

At block 1110, the example threshold value determining circuitry 206 determines whether to analyze an additional input signal. For example, the threshold value determining circuitry 206 determines whether any of the input signals 224 (FIG. 2) have not been analyzed and/or selected. If the example threshold value determining circuitry 206 determines to analyze an additional input signal, the operations 1008 return to block 1106, at which the threshold value determining circuitry 206 selects another input signal. When the example threshold value determining circuitry 206 is not to analyze any other input signals, control returns to block 1010 of FIG. 10.

At block 1112, the threshold value determining circuitry 206 obtains threshold(s) (predefined or otherwise) from the threshold registers 208. Thereafter control returns to block 1010 of FIG. 10.

Figure 12:
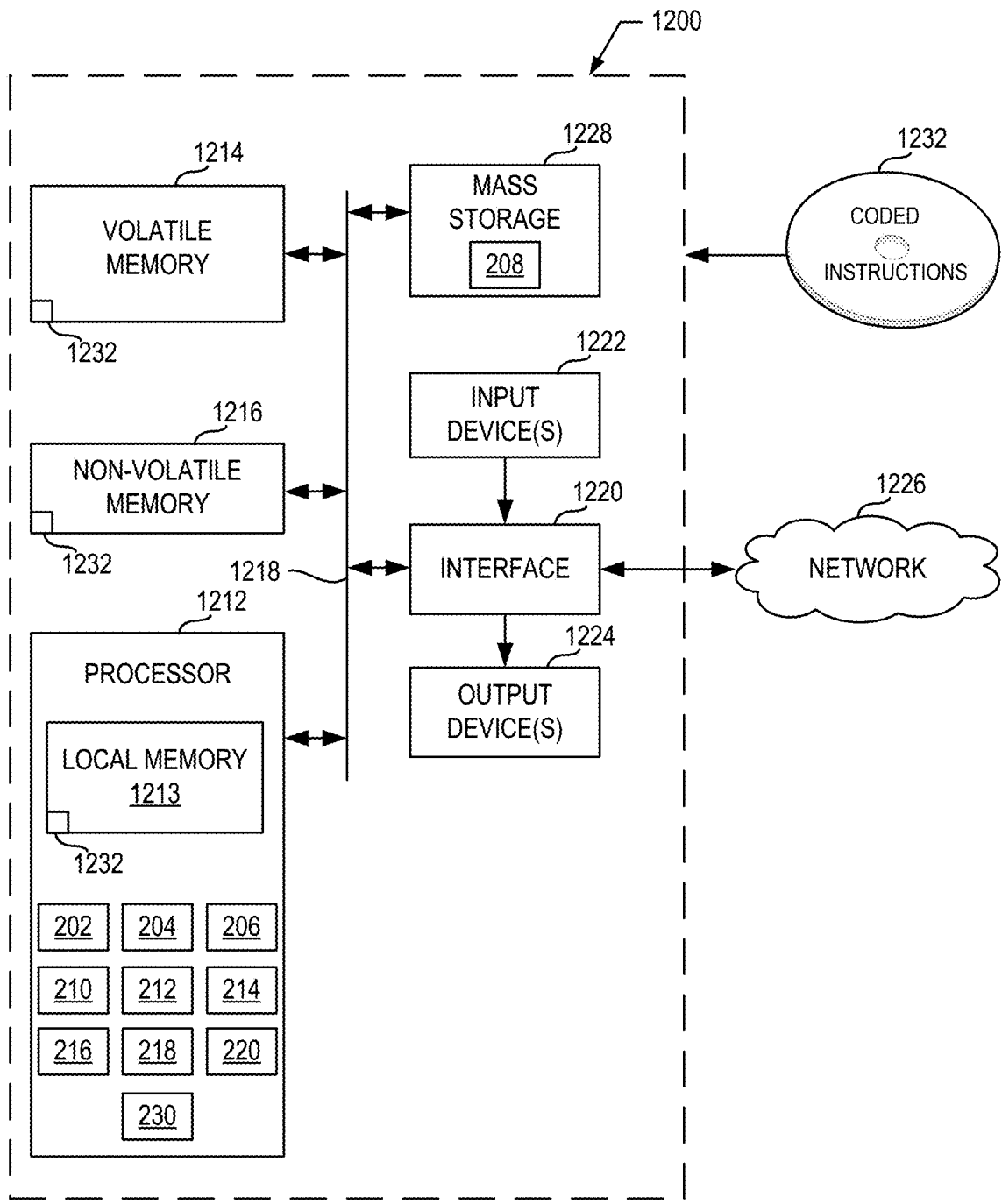
FIG. 12 is a block diagram of an example processing platform including processor circuitry structured to execute the example machine readable instructions of FIGS. 10-11 to implement the example alignment controlling circuitry of FIG. 2.

FIG. 12 is a block diagram of an example processor platform 1200 structured to execute and/or instantiate the machine readable instructions and/or operations of FIGS. 10-11 to implement the example alignment controlling circuitry 200 of FIG. 2. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the example input signal selecting circuitry 202, the example clock signal generating circuitry 204, the example threshold value determining circuitry 206, the example counter 210, the example watch dog timer 212, the example comparator 214, the example process length comparator 216, the example signal deferring circuitry 218, the example signal supplying circuitry 220, and the example power controlling circuitry 230.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output devices 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1232, which may be implemented by the machine readable instructions of FIGS. 10-11, may be stored in the mass storage device 1228, in the volatile memory 1214, in the non-volatile memory 1216, and/or on a removable non-transitory computer readable storage medium such as a CD or DVD.

Figure 13:
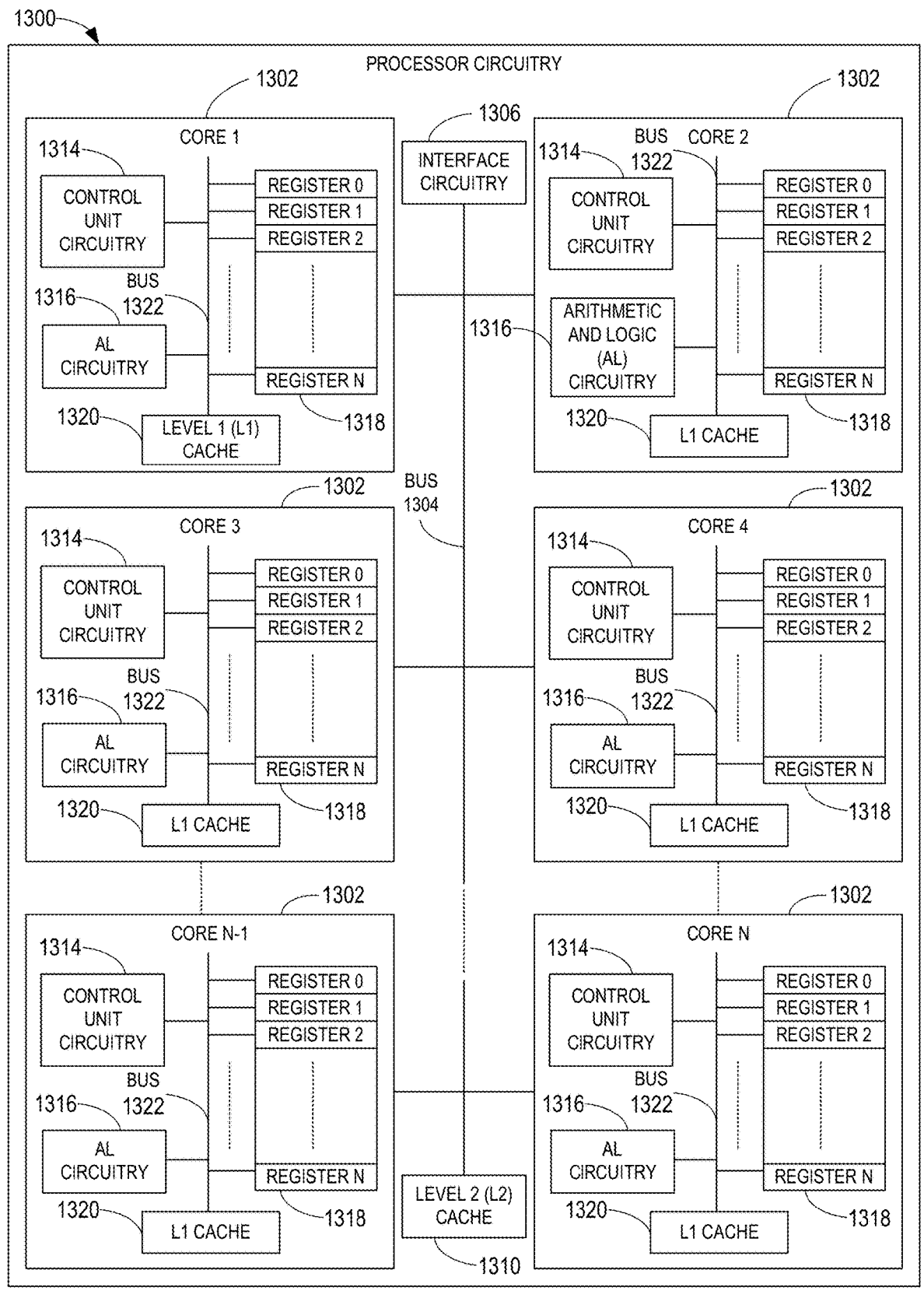
FIG. 13 is a block diagram of an example implementation of the processor circuitry of FIG. 12.

FIG. 13 is a block diagram of an example implementation of the processor circuitry 1212 of FIG. 12. In this example, the processor circuitry 1212 of FIG. 12 is implemented by a microprocessor 1300. For example, the microprocessor 1300 may implement multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowcharts of FIGS. 10-11.

The cores 1302 may communicate by an example bus 1304. In some examples, the bus 1304 may implement a communication bus to effectuate communication associated with one(s) of the cores 1302. For example, the bus 1304 may implement at least one of an Inter-Integrated Circuit (I2C) bus, a Serial Peripheral Interface (SPI) bus, a PCI bus, or a PCIe bus. Additionally or alternatively, the bus 1304 may implement any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2_cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an ALU) 1316, a plurality of registers 1318, the L1 cache 1320, and an example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating point operations. In yet other examples, the AL circuitry 1316 may include first AL circuitry that performs integer based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register(s), flag register(s), segment register(s), machine specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure including distributed throughout the core 1302 to shorten access time. The bus 1322 may implement at least one of an I2C bus, a SPI bus, a PCI bus, or a PCIe bus Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
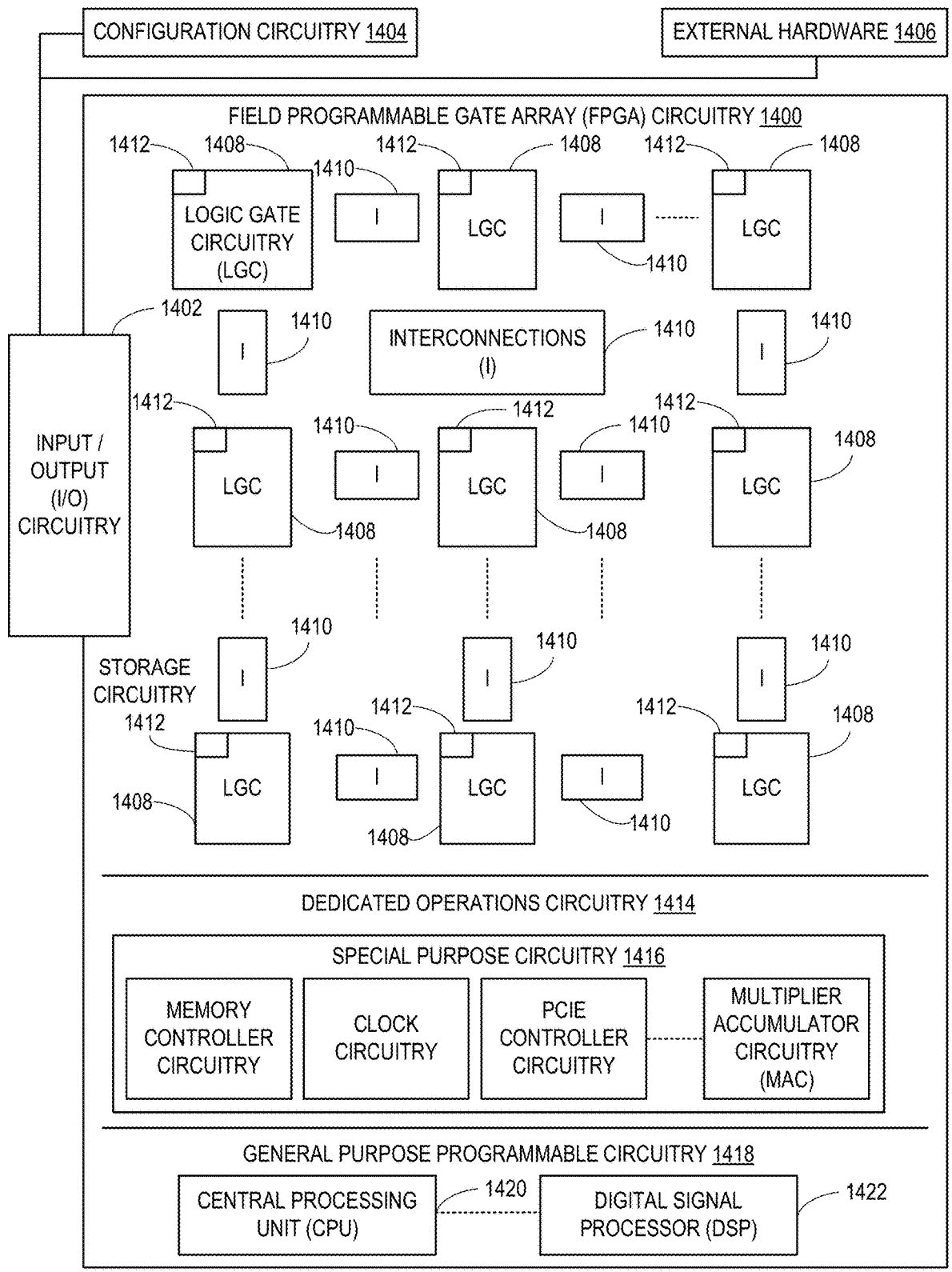
FIG. 14 is a block diagram of another example implementation of the processor circuitry of FIG. 12.

FIG. 14 is a block diagram of another example implementation of the processor circuitry 1212 of FIG. 12. In this example, the processor circuitry 1212 is implemented by FPGA circuitry 1400. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the machine readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine readable instructions represented by the flowcharts of FIGS. 10-11 but whose interconnections and logic circuitry are fixed once fabricated), the FPGA circuitry 1400 of the example of FIG. 14 includes interconnections and logic circuitry that may be configured and/or interconnected in different ways after fabrication to instantiate, for example, some or all of the machine readable instructions represented by the flowcharts of FIGS. 10-11. In particular, the FPGA 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowcharts of FIGS. 10-11. As such, the FPGA circuitry 1400 may be structured to effectively instantiate some or all of the machine readable instructions of the flowcharts of FIGS. 10-11 as dedicated logic circuits to perform the operations corresponding to those software instructions in a dedicated manner analogous to an ASIC. Therefore, the FPGA circuitry 1400 may perform the operations corresponding to the some or all of the machine readable instructions of FIGS. 10-11 faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 14, includes example input/output (I/O) circuitry 1402 to obtain and/or output data to/from example configuration circuitry 1404 and/or external hardware (e.g., external hardware circuitry) 1406. For example, the configuration circuitry 1404 may implement interface circuitry that may obtain machine readable instructions to configure the FPGA circuitry 1400, or portion(s) thereof. In some such examples, the configuration circuitry 1404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may implement the microprocessor 1300 of FIG. 13. The FPGA circuitry 1400 also includes an array of example logic gate circuitry 1408, a plurality of example configurable interconnections 1410, and example storage circuitry 1412. The logic gate circuitry 1408 and interconnections 1410 are configurable to instantiate one or more operations that may correspond to at least some of the machine readable instructions of FIGS. 10-11 and/or other desired operations. The logic gate circuitry 1408 shown in FIG. 14 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the processor circuitry 1212 of FIG. 12, many other approaches are contemplated. For example, as mentioned above, modern FPGA circuitry may include an on-board CPU, such as one or more of the example CPU 1420 of FIG. 14. Therefore, the processor circuitry 1212 of FIG. 12 may additionally be implemented by combining the example microprocessor 1300 of FIG. 13 and the example FPGA circuitry 1400 of FIG. 14. In some such hybrid examples, a first portion of the machine readable instructions represented by the flowcharts of FIGS. 10-11 may be executed by one or more of the cores 1302 of FIG. 13 and a second portion of the machine readable instructions represented by the flowcharts of FIGS. 10-11 may be executed by the FPGA circuitry 1400 of FIG. 14.

In some examples, the processor circuitry 1212 of FIG. 12 may be in one or more packages. For example, the processor circuitry 1300 of FIG. 13 and/or the FPGA circuitry 1400 of FIG. 14 may be in one or more packages. In some examples, an XPU may be implemented by the processor circuitry 1212 of FIG. 12, which may be in one or more packages. For example, the XPU may include a CPU in one package, a DSP in another package, a GPU in yet another package, and an FPGA in still yet another package.

Figure 15:
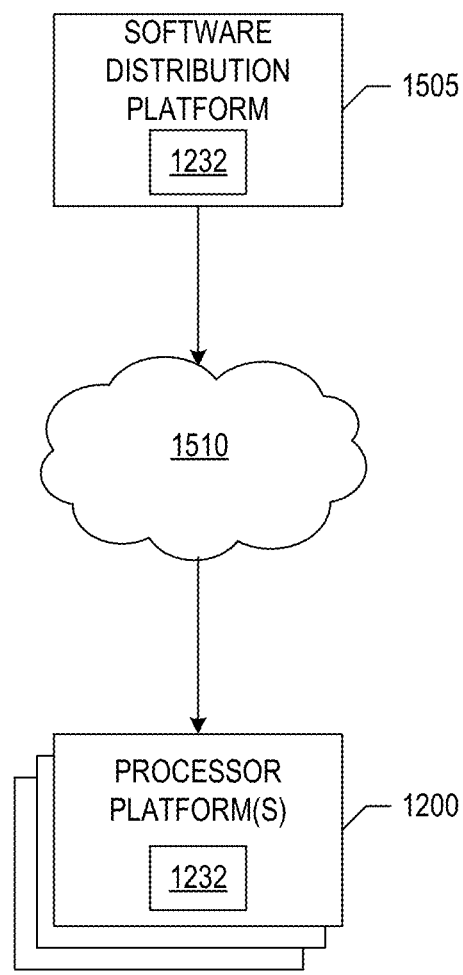
FIG. 15 is a block diagram of an example software distribution platform (e.g., one or more servers) to distribute software (e.g., software corresponding to the example machine readable instructions of FIGS. 10-11) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1505 to distribute software such as the example machine readable instructions 1232 of FIG. 12 to hardware devices owned and/or operated by third parties is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform 1505. For example, the entity that owns and/or operates the software distribution platform 1505 may be a developer, a seller, and/or a licensor of software such as the example machine readable instructions 1232 of FIG. 12. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the machine readable instructions 1232, which may correspond to the example machine readable instructions of FIGS. 10-11, as described above. The one or more servers of the example software distribution platform 1505 are in communication with a network 1510, which may correspond to any one or more of the Internet and/or any of the example networks 1226 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1232 from the software distribution platform 1505. For example, the software, which may correspond to the example machine readable instructions of FIGS. 10-11, may be downloaded to the example processor platform 1200, which is to execute the machine readable instructions 1232 to implement the example alignment controlling circuitry 200. In some example, one or more servers of the software distribution platform 1505 periodically offer, transmit, and/or force updates to the software (e.g., the example machine readable instructions 1232 of FIG. 12) to ensure improvements, patches, updates, etc., are distributed and applied to the software at the end user devices.

From the foregoing, it will be appreciated that example systems, methods, apparatus, and articles of manufacture have been disclosed that align media workloads. The disclosed systems, methods, apparatus, and articles of manufacture improve the efficiency of using a computing device by aligning media workloads to reduce package residency of the computing device. For example, the disclosed systems, methods, apparatus, and articles of manufacture align processing executed by the IP devices of the user device to generate a power gating period. In examples disclosed herein, the IP devices enter a low power state during the power gating period. Thus, the disclosed systems, methods, apparatus, and articles of manufacture reduce power consumption of the computing device during video conferencing applications. Additionally or alternatively, the disclosed systems, methods, apparatus, and articles of manufacture implement a streaming buffer to reduce latency during video conferencing applications. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to align media workloads are disclosed herein. Further examples and combinations thereof include the following:

Example 1 includes an apparatus to align processing events, the apparatus comprising a comparator to compare a value of a counter to a threshold value, the threshold value associated with an amount of time to defer provision of at least one of first or second input signals, respectively, to a corresponding one of a first or second IP device, respectively, signal deferring circuitry to defer provision of the at least one of the first or second input signals to a corresponding one of the first or second IP devices based on an output of the comparator, deferral of the at least one of the first or second input signals to cause alignment of first and second processing events performed by the first and second IP devices, respectively, and power controlling circuitry to cause the first and second IP devices to power down based on completion of the first and second processing events.

Example 2 includes the apparatus of example 1, wherein the threshold value is equal to a selected start time and a time at which the second input signal is to be supplied to the second IP device.

Example 3 includes the apparatus of example 1, wherein the second input signal is to be provided as a second output signal to a second output port at a same time as a first input signal is to be supplied to a first output port, wherein the first and second output ports are coupled to the first and second IP devices, respectively, and the second output signal is to be used by the second IP device to perform the second processing event.

Example 4 includes the apparatus of example 1, wherein the threshold value is determined and loaded into in a threshold register prior to a selected start time.

Example 5 includes the apparatus of example 4, wherein the selected start time corresponds to a time at which the first input signal is expected to be received at a first input port.

Example 6 includes the apparatus of example 1, further including a watch dog timer to determine when an expected time of arrival of the first input signal exceeds an expiration time of the watch dog timer, and signal supplying circuitry to cause transmission of the second input signal to a second output port based on the expiration time of the watch dog timer being exceeded.

Example 7 includes the apparatus of example 1, wherein the first and second IP devices are implemented as part of a video conferencing application.

Example 8 includes the apparatus of example 1, wherein a first amount of time extending from a selected start time to a completion time at which both the first and second processing events have completed added to a second amount of time during which the first and second IP devices are powered down is equal to a third amount of time to process a portion of a data frame, the data frame including at least one of 1) audio data, 2) video data, or 3) audio data and video data.

Example 9 includes the apparatus of example 8, wherein the threshold value is increased by a length of time corresponding to a portion of a total amount of time to process the data frame, the increased threshold value used to control deferral of another first input signal received after the first and second IP devices have exited a power down state, the power down state corresponding to a state in which the first and second IP devices are powered down.

Example 10 includes the apparatus of example 8, wherein the third amount of time is equal to one-third of a total amount of time to process the data frame.

Example 11 includes the apparatus of example 1, further including a third input signal corresponding to a third IP device, and the apparatus further including, a process length comparator to compare first, second and third durations of time corresponding to the first processing event, the second processing event, and a third processing event, respectively, an output of the process length comparator to identify a longest one of the first, second, or third durations, and threshold value determining circuitry to determine a first threshold value, and a second threshold value, the first and second threshold values to cause all of the first, second, and third processing events to be started and completed within the longest one of the first, second, or third durations of time.

Example 12 includes the apparatus of example 1, wherein the first and second processing events performed by the first and second IP devices, respectively, are to be aligned to start or complete at a same time.

Example 13 includes an apparatus to align processing events, the apparatus comprising at least one memory, instructions, and at least one processor to execute the instructions to compare a value of a counter to a threshold value, the threshold value associated with an amount of time to defer provision of at least one of first or second input signals, respectively, to a corresponding one of a first or second IP device, respectively, cause provision of the at least one of the first or second input signals to a corresponding one of the first or second IP devices to be deferred based on the comparison, deferral of the at least one of the first or second input signals to cause alignment of first and second processing events performed by the first and second IP devices, respectively, and cause the first and second IP devices to power down based on completion of the first and second processing events.

Example 14 includes the apparatus of example 13, wherein the threshold value is equal to a selected start time and a time at which the second input signal is to be supplied to the second IP device.

Example 15 includes the apparatus of example 13, wherein the second input signal is to be provided as a second output signal to a second output port at a same time as a first input signal is to be supplied to a first output port, wherein the first and second output ports are coupled to the first and second IP devices, respectively, and the second output signal is to be used by the second IP device to perform the second processing event.

Example 16 includes the apparatus of example 13, wherein the threshold value is determined and loaded into in a threshold register prior to a selected start time.

Example 17 includes the apparatus of example 16, wherein the selected start time corresponds to a time at which the first input signal is expected to be received at a first input port.

Example 18 includes the apparatus of example 13, wherein the at least one processor is to execute the instructions to determine when an expected time of arrival of the first input signal exceeds an expiration time, and cause transmission of the second input signal to a second output port based on the expiration time being exceeded.

Example 19 includes the apparatus of example 13, wherein the first and second IP devices are implemented as part of a video conferencing application.

Example 20 includes the apparatus of example 13, wherein a first amount of time extending from a selected start time to a completion time at which both the first and second processing events have completed added to a second amount of time during which the first and second IP devices are powered down is equal to a third amount of time to process a portion of a data frame, the data frame including at least one of 1) audio data, 2) video data, or 3) audio data and video data.

Example 21 includes the apparatus of example 20, wherein the threshold value is increased by a length of time corresponding to a portion of a total amount of time to process the data frame, the increased threshold value used to control deferral of another first input signal received after the first and second IP devices have exited a power down state, the power down state corresponding to a state in which the first and second IP devices are powered down.

Example 22 includes the apparatus of example 20, wherein the third amount of time is equal to one-third of a total amount of time to process the data frame.

Example 23 includes the apparatus of example 13, wherein the at least one processor is to execute the instructions to compare first, second and third durations of time corresponding to the first processing event, the second processing event, and a third processing event, respectively, the comparison to identify a longest one of the first, second, or third durations, and determine a first threshold value and a second threshold value, the first and second threshold values to cause all of the first, second, and third processing events to be started and completed within the longest one of the first, second, or third durations of time.

Example 24 includes the apparatus of example 13, wherein the first and second processing events performed by the first and second IP devices, respectively, are to be aligned to start or complete at a same time.

Example 25 includes at least one non-transitory computer readable medium comprising instructions that, when executed, cause at least one processor to at least compare a value of a counter to a threshold value, the threshold value associated with an amount of time to defer provision of at least one of first or second input signals, respectively, to a corresponding one of a first or second IP device, respectively, cause provision of the at least one of the first or second input signals to a corresponding one of the first or second IP devices to be deferred based on the comparison, deferral of the at least one of the first or second input signals to cause alignment of first and second processing events performed by the respective first and second IP devices, respectively, and cause the first and second IP devices to power down based on completion of the first and second processing events.

Example 26 includes the at least one non-transitory computer readable medium of example 25, wherein the threshold value is equal to a selected start time and a time at which the second input signal is to be supplied to the second IP device.

Example 27 includes the at least one non-transitory computer readable medium of example 25, wherein the second input signal is to be provided as a second output signal to a second output port at a same time as a first input signal is to be supplied to a first output port, wherein the first and second output ports are coupled to the first and second IP devices, respectively, and the second output signal is to be used by the second IP device to perform the second processing event.

Example 28 includes the at least one non-transitory computer readable medium of example 25, wherein the threshold value is determined and loaded into in a threshold register prior to a selected start time.

Example 29 includes the at least one non-transitory computer readable medium of example 28, wherein the selected start time corresponds to a time at which the first input signal is expected to be received at a first input port.

Example 30 includes the at least one non-transitory computer readable medium of example 25, wherein the instructions, when executed, cause the at least one processor to determine when an expected time of arrival of the first input signal exceeds an expiration time, and cause transmission of the second input signal to a second output port based on the expiration time being exceeded.

Example 31 includes the at least one non-transitory computer readable medium of example 25, wherein the first and second IP devices operate to process audio data or video data collected by an input of a video conferencing application.

Example 32 includes the at least one non-transitory computer readable medium of example 25, wherein a first amount of time extending from a selected start time to a completion time at which both the first and second processing events have completed added to a second amount of time during which the first and second IP devices are powered down is equal to a third amount of time to process at least a portion of a data frame, the data frame including at least one of 1) audio data, 2) video data, or 3) audio data and video data.

Example 33 includes the at least one non-transitory computer readable medium of example 32, wherein the threshold value is increased by a length of time corresponding to a portion of a total amount of time to process the data frame, the increased threshold value used to control deferral of another first input signal received after the first and second IP devices have exited a power down state, the power down state corresponding to a state in which the first and second IP devices are powered down.

Example 34 includes the at least one non-transitory computer readable medium of example 32, wherein the third amount of time to process the portion of the data frame is equal to one-third of a total time to process the data frame.

Example 35 includes the at least one non-transitory computer readable medium of example 25, wherein the threshold value is a first threshold value, and the instructions, when executed, cause the at least one processor to compare first, second and third durations of time corresponding to the first processing event, the second processing event, and a third processing event, respectively, the comparison to identify a longest one of the first, second, and third durations of time, and determine at least a first threshold value and a second threshold value, the first and second threshold values to cause all of the first, second, and third processing events to be started and completed within the longest one of the first, second, and third durations of time.

Example 36 includes the at least one non-transitory computer readable medium of example 25, wherein the first and second processing events performed by the first and second IP devices, respectively are to be aligned to start or complete at a same time.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   a comparator to compare a counter value to a threshold value, the threshold value associated with an amount of time to defer provision of at least one of a first input signal to a first device or a second input signal to a second device;
   signal deferring circuitry to defer provision of the at least one of the first input signal or the second input signal based on comparison of the counter value to the threshold value, deferral of the at least one of the first input signal or the second input signal to cause alignment of a first processing event performed by the first device and a second processing event performed by the second device;
   a watch dog timer to determine whether an expected time of arrival of the first input signal exceeds an expiration time of the watch dog timer;
   signal supplying circuitry to cause transmission of the second input signal to an output port based on the expected time of arrival of the first input signal exceeding the expiration time of the watch dog timer; and
   power controlling circuitry to cause the first device and the second device to power down based on completion of the first processing event and the second processing event.

2. The apparatus of claim 1, wherein the threshold value is based on a difference between a selected start time and a time at which the second input signal is to be supplied to the second device.

3. The apparatus of claim 1, wherein the second input signal is to be provided as a second output signal to a second output port at a same time as the first input signal is to be supplied to a first output port, the first output port is coupled to the first device, the second output port is coupled to the second device, and the second output signal is to be used by the second device to perform the second processing event.

4. The apparatus of claim 1, wherein the first device and the second device are implemented as part of a video conferencing application.

5. The apparatus of claim 1, wherein addition of (i) a first amount of time extending from a selected start time to a completion time at which both the first processing event and the second processing event have completed and (ii) a second amount of time during which the first device and the second IP device are powered down corresponds to (iii) a third amount of time to process a portion of a data frame, the data frame including at least one of: 1) audio data, 2) video data, or 3) audio data and video data.

6. The apparatus of claim 5, wherein including:
   threshold value determining circuitry to increase the threshold value by a length of time corresponding to a portion of a total amount of time to process the data frame; and
   wherein the signal deferring circuitry is to control, based on the increased threshold value, deferral of another first input signal received after the first device and the second device have exited a power down state, the power down state corresponding to a state in which the first device and the second device are powered down.

7. The apparatus of claim 1, including:
   a process length comparator to compare a first duration of time corresponding to the first processing event, a second duration of time corresponding to the second processing event, and a third duration of time corresponding to a third processing event to identify a longest duration of time among the first duration of time, the second duration of time, and the third duration of time; and
   threshold value determining circuitry to determine a first threshold value and a second threshold value to cause all of the first processing event, the second processing event, and the third processing event to be started and completed within the longest duration of time.

8. The apparatus of claim 1, wherein the deferral of the at least one of the first input signal or the second input signal is to cause the first processing event and the second processing event to be aligned to at least one of start or complete at a same time.

9. An apparatus comprising:
   at least one memory;
   instructions; and
   at least one processor circuit to be programmed based on the instructions to:
      compare a first duration of time corresponding to a first processing event, a second duration of time corresponding to a second processing event, and a third duration of time corresponding to a third processing event to identify a longest duration of time among the first duration of time, the second duration of time, and the third duration of time, the first processing event performed by a first device, the second processing event performed by a second device and the third processing event performed by a third device;
      determine a first threshold value and a second threshold value to cause the first processing event, the second processing event, and the third processing event to be started and completed within the longest duration of time;
      cause provision of at least one of a first input signal to the first device, a second input signal to the second IP devices device or a third input signal to the third device to be deferred based on the first threshold value and the second threshold value; and
      cause the first device and the second device to power down based on completion of the first processing event and the second processing event.

10. The apparatus of claim 9, wherein one or more of the at least one processor circuit is to determine the first threshold value based on a difference between a selected start time and a time at which the second input signal is to be supplied to the second device.

11. The apparatus of claim 9, wherein one or more of the at least one processor circuit is to:
   determine whether an expected time of arrival of the first input signal exceeds an expiration time; and cause transmission of the second input signal to an output port based on the expected time of arrival of the first input signal exceeding the expiration time.

12. The apparatus of claim 9, wherein the first device and the second device are implemented as part of a video conferencing application.

13. The apparatus of claim 9, wherein addition of (i) a first amount of time extending from a selected start time to a completion time at which both the first processing event and the second processing event have completed and (ii) a second amount of time during which the first device and the second IP device are powered down corresponds to (iii) a third amount of time to process a portion of a data frame, the data frame including at least one of: 1) audio data, 2) video data, or 3) audio data and video data.

14. The apparatus of claim 13, wherein one or more of the at least one processor circuit is to:
increase the first threshold value by a length of time corresponding to a portion of a total amount of time to process the data frame; and
control, based on the increased first threshold value, deferral of another first input signal received after the first device and the second device have exited a power down state, the power down state corresponding to a state in which the first device and the second device are powered down.

15. The apparatus of claim 9, wherein one or more of the at least one processor circuit is to defer provision of the least one of the first input signal, the second input signal or the third input signal to cause at least the first processing event and the second processing event to be aligned to at least one of start or complete at a same time.

16. At least one non-transitory computer readable medium comprising instructions to cause at least one processor circuit to at least:
compare a counter value to a threshold value, the threshold value associated with an amount of time to defer provision of at least one of a first input signal to a first device or a second input signal to a second device;
cause provision of the at least one of the first input signal or the second input signal to be deferred based on the comparison of the counter value to the threshold value, deferral of the at least one of the first input signal or the second input signal to cause alignment of a first processing event performed by the first device and a second processing event performed by the second device such that addition of (i) a first amount of time extending from a selected start time to a completion time at which both the first processing event and the second processing event have completed and (ii) a second amount of time during which the first device and the second device are powered down corresponds to (iii) a third amount of time to process a portion of a data frame, the data frame including at least one of: 1) audio data, 2) video data, or 3) audio data and video data; and cause the first device and the second device to power down based on completion of the first processing event and the second processing events event.

17. The at least one non-transitory computer readable medium of claim 16, wherein the threshold value is based on a difference between a selected start time and a time at which the second input signal is to be supplied to the second device.

18. The at least one non-transitory computer readable medium of claim 16, wherein the instructions are to cause one or more or the at least one processor circuit to:
determine whether an expected time of arrival of the first input signal exceeds an expiration time; and
cause transmission of the second input signal to an output port based on the expiration time being exceeded by the expected time of arrival of the first input signal.

19. The at least one non-transitory computer readable medium of claim 16, wherein the first device and the second device operate to process at least one of audio data or video data input to a video conferencing application.

20. The at least one non-transitory computer readable medium of claim 16, wherein the instructions are to cause one or more of the at least one processor circuit to:
increase the threshold value by a length of time corresponding to a portion of a total amount of time to process the data frame; and
control, based on the increased threshold value, deferral of another first input signal received after the first device and second device have exited a power down state, the power down state corresponding to a state in which the first device and the second device are powered down.

21. The at least one non-transitory computer readable medium of claim 16, wherein the threshold value is a first threshold value, and the instructions are to cause one or more of the at least one processor circuit to:
compare first duration of time corresponding to the first processing event, a second duration of time corresponding to the second processing event, and a third duration of time corresponding to a third processing event to identify a longest duration of time among the first duration of time, the second duration of time, and the third durations of time; and
determine at least the first threshold value and a second threshold value to cause the first processing event, the second processing event, and the third processing event to be started and completed within the longest duration of time.

22. The at least one non-transitory computer readable medium of claim 16, wherein the deferral of the least one of the first input signal or the second input signal is to cause the first processing event and the second processing event to be aligned to at least one of start or complete at a same time.

* * * * *

UNITED STATES PATENT AND TRADEMARK OFFICE
CERTIFICATE OF CORRECTION

Page 1 of 1

PATENT NO. : 12,393,471 B2
APPLICATION NO. : 17/359308
DATED : August 19, 2025
INVENTOR(S) : Srivastava et al.

It is certified that error appears in the above-identified patent and that said Letters Patent is hereby corrected as shown below:

In the Claims

Column 33, Line 64 (Claim 5), delete "IP"

Column 34, Line 23 (Claim 7), delete "all of"

Column 34, Line 53 (Claim 9), delete "IP devices"

Column 35, Line 12 (Claim 13), delete "IP"

Column 36, Line 3 (Claim 16), delete "events"

Signed and Sealed this
Eleventh Day of November, 2025

John A. Squires
*Director of the United States Patent and Trademark Office*